US007268906B2

(12) United States Patent
Ruhl et al.

(10) Patent No.: US 7,268,906 B2
(45) Date of Patent: *Sep. 11, 2007

(54) SYSTEMS AND METHODS FOR AUTHENTICATING AND VERIFYING DOCUMENTS

(75) Inventors: Jan Matthias Ruhl, Somerville, MA (US); David Goldberg, Palo Alto, CA (US); Marshall W. Bern, San Carlos, CA (US)

(73) Assignee: Xerox Corporation, Stamford, CT (US)

( * ) Notice: Subject to any disclaimer, the term of this patent is extended or adjusted under 35 U.S.C. 154(b) by 1012 days.

This patent is subject to a terminal disclaimer.

(21) Appl. No.: 10/248,135

(22) Filed: Dec. 19, 2002

(65) Prior Publication Data

US 2003/0128375 A1    Jul. 10, 2003

Related U.S. Application Data

(60) Provisional application No. 60/344,813, filed on Jan. 7, 2002.

(51) Int. Cl.
    *G06F 15/00* (2006.01)
(52) U.S. Cl. ............... 358/1.15; 358/1.6; 358/1.16; 382/100; 382/180; 340/5.86; 713/150
(58) Field of Classification Search ............... 358/1.15; 713/150; 382/180; 340/5.86
    See application file for complete search history.

(56) References Cited

U.S. PATENT DOCUMENTS 5,852,684 A * 12/1998 Lopresti et al. ............ 382/309

6,394,358 B1 * 5/2002 Thaxton et al. ............ 235/494
6,532,541 B1 * 3/2003 Chang et al. ............... 713/176
6,628,837 B1 * 9/2003 Greene et al. ............. 382/232
6,654,501 B1 * 11/2003 Acharya et al. ............ 382/235
6,741,722 B2 * 5/2004 Abe ............................ 382/100

(Continued)

OTHER PUBLICATIONS

V. Gupata et al., "Efficient Linear Logic Meaning Assembly," *Proc. Coling-ACL 98*, Montreal, Canada, Aug. 10-14, 1998.

(Continued)

*Primary Examiner*—Twyler Lamb
*Assistant Examiner*—Mark R. Milia
(74) *Attorney, Agent, or Firm*—Oliff & Berridge PLC

(57) ABSTRACT

Xerox Docket No. D/A0037Q Document authentication is accomplished by acquiring document image data, generating a set of features of the document, and generating an assist channel that includes information on how to generate the set of features. The set of features and the assist channel are digitally signed and then append to the document. Document verification is accomplished by acquiring document image data and verifying the signature. If the signature is valid, a set of features of the document is generated using information contained in the assist channel appended to the document. The generated set of features is then compared to the set of features appended on the document. If the sets do not match, the document is determined to have been altered sometimes after the assist channel was appended to the document, i.e., the document is not genuine. Otherwise, the document can be considered to be genuine.

38 Claims, 14 Drawing Sheets

U.S. PATENT DOCUMENTS

| | | | |
|---|---|---|---|
| 6,879,703 B2 * | 4/2005 | Lin et al. | 382/100 |
| 7,007,303 B2 * | 2/2006 | Goldberg et al. | 726/26 |
| 7,069,443 B2 * | 6/2006 | Berringer et al. | 713/180 |
| 7,130,445 B2 * | 10/2006 | Ruhl et al. | 382/100 |
| 2002/0031276 A1 * | 3/2002 | Yagishita et al. | 382/252 |
| 2002/0118837 A1 * | 8/2002 | Hamilton | 380/277 |

OTHER PUBLICATIONS

U.S. Appl. No. 09/574,268.
U.S. Appl. No. 09/574,270.
U.S. Appl. No. 09/574,274.
U.S. Appl. No. 09/574,406.

* cited by examiner

US 7,268,906 B2

SYSTEMS AND METHODS FOR AUTHENTICATING AND VERIFYING DOCUMENTS

BACKGROUND OF THE INVENTION

This non-provisional application claims the benefit of U.S. Provisional Application No. 60/344,813, filed Jan. 7, 2002, which is incorporated herein by reference in its entirety.

FIELD OF INVENTION

This invention is directed to systems and methods for authenticating and verifying documents.

DESCRIPTION OF RELATED ART

There are a number of situations where a sender transmits a document to a receiver and wants to assure the receiver that the document has not been altered during the transmission. In other words, the sender wants to authenticate the document.

Paper documents are traditionally authenticated either through elaborate printing techniques, such as, for example, money, or through trusted signatures and stamps, such as, for example, notarizing by a public notary. The signing and verifying processes of these current methods are not automated and require human intervention. Nor are these processes very reliable.

There are more recent methods that work on digital document data. These methods are applied to paper documents by acquiring a scanned image of a printed document. The resulting bit-stream is then signed using some known digital signing scheme. These techniques, unfortunately, do not work well because, when the same document is scanned separately by the sender and the receiver, the resulting bit-streams are different. This occurs due to the noise inherent in scanning a document, even when using the same device. The noise introduced by scanning makes it difficult to construct an authentication scheme that is resilient in view of the noise.

A method that authenticates photo-identification cards and has to cope with noise being introduced due to scanning is disclosed in "Secure Identification Documents Via Pattern Recognition and Public-Key Cryptography", by L. O'Gorman et al., IEEE Transactions on Pattern Analysis and Machine Intelligence, Vol. 20, No. 10, pages 1097-1102, October 1998. However, the authentication signature disclosed by O'Gorman et al. has a file size that is linear to the size of the photograph. This method does not scale well as the size of a document increases. The method disclosed in O'Gorman et al. would create an authentication file that would be large in comparison to document. This tends to render the O'Gorman et al. method inefficient.

SUMMARY OF THE INVENTION

Due to the presence of noise in the scanning process of hard copy documents, conventional authenticating schemes cannot guarantee that the authenticated document is unchanged.

This invention provides systems and methods for authenticating documents.

This invention separately provides systems and methods for authenticating documents that append a file to a document that will allow a receiver to subsequently verify the document based on the appended file.

This invention separately provides systems and methods for determining a set of features a document, inputting the features into a hash function, digitally signing the output of the hash function, and appending the signature to the document.

This invention separately provides systems and methods that generate a self-contained notarized document where verification does not require reference to a remote digital copy of the document.

In various exemplary embodiments of the systems and methods according to this invention, document authentication is accomplished by acquiring document image data, generating a set of features of the document and generating an assist channel that includes information on how to reliably reproduce the set of features. The set of features and the assist channel are digitally signed and then append to the document. In various exemplary embodiments, the set of features includes hash values generated from one or more of the generated features of the document.

In various exemplary embodiments of the systems and methods according to this invention, document verification is accomplished by acquiring document image data and verifying the signature. If the signature is valid, a set of features of the document is generated using information contained in the assist channel appended to the document. In various exemplary embodiments, the generated set of features is then compared to the set of features appended on the document. If the sets do not match, the document is determined to have been altered sometimes after the assist channel was appended to the document, i.e., the document is not genuine. Otherwise, the document can be considered to be genuine.

In various other exemplary embodiments, hash values are generated from one or more of the generated features. The one or more sets of hash values are then compared to the one or more sets of hash values appended on the document. If the sets of hash values do not match, the document is determined to have been altered sometimes after the assist channel was appended to the document, i.e., the document is not genuine. Otherwise, the document can be considered to be genuine.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of this invention will be described in detail, with reference to the following figures, wherein.

DETAILED DESCRIPTION OF THE EXEMPLARY EMBODIMENTS

Figure 1:
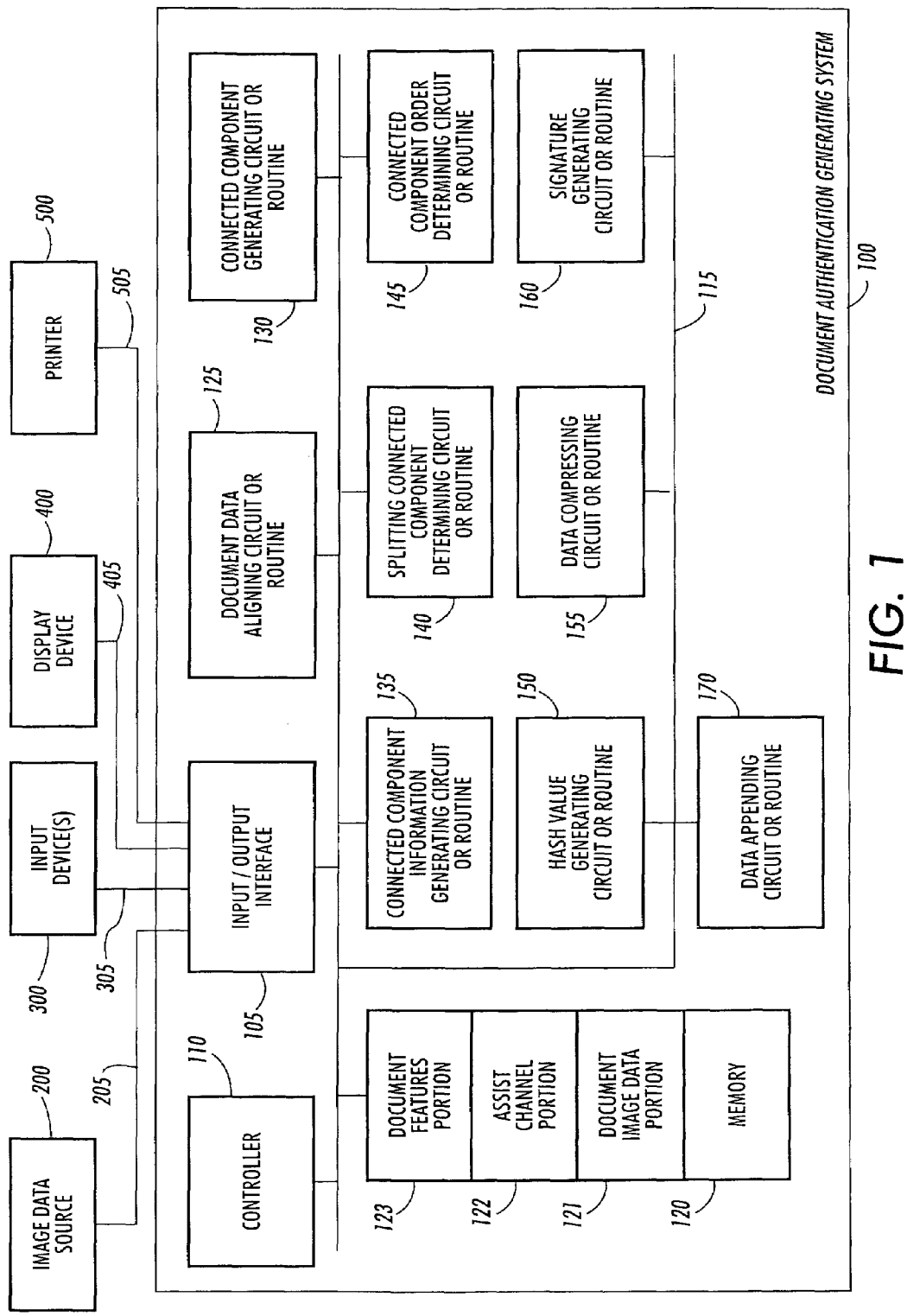
FIG. 1 is a block diagram of one exemplary embodiment of a document authentication generating device according to this invention.

Due to the presence of noise in the scanning process of hard copy documents, conventional digital authenticating schemes cannot guarantee that the authenticated document is unchanged. This invention provides systems and methods for authenticating and verifying documents to detect such changes or confirm that the document is unchanged. One exemplary embodiment for notarizing a paper document is disclosed in M. Ruhl et al, "Secure Notarization of Paper Text Documents, Twelfth Annual Symposium on Discrete Algorithms, Jan. 7-9, 2001, Washington, D.C., which is incorporated herein by reference in its entirety. Other exemplary embodiments for using verification assist data to verify a paper document are disclosed in U.S. patent application Ser. Nos. 09/574,268, 09/574,270, 09/574,274 and 09/574,406, each incorporated herein by reference in its entirety. The various exemplary embodiments of the systems and methods according to this invention will detect substantially all "significant" changes. For black and white text documents, a "significant" change can include, for example, as small a change as a character change in the document or a non-negligible character position change.

In various exemplary embodiments of the systems and methods according to this invention, a signer or sender of a document, to allow the document to be authenticated according to the systems and methods of this invention, prints alignment marks on the document to be authenticated and/or notarized. In various exemplary embodiments, the alignment marks are located in the corners of the document, but the alignment marks could be located anywhere in the document. When scanning in the document, these alignment marks are mapped to specified coordinates. The rest of the image is then rescaled accordingly. These alignment marks act as reference points that allow for compensation for distortions in the scanning process.

However, it should be appreciated that alignment marks are not strictly necessary. That is, in various exemplary embodiments, the image of the document can be rescaled based on the boundaries, or any other appropriate feature, that is inherent in the image itself. Thus, in these exemplary embodiments, alignment marks are not used to align or rescale the image. Furthermore, in various other exemplary embodiments, rescaling the document image may be completely omitted. Of course, in this case, alignment marks are not necessary.

The signer creates an assist channel, which is, for example, stored in a file, that will include information and/or hints usable by the verifier and/or receiver. The signer adds a gray-level histogram to the assist channel to account for changes in brightness and contrast between the sender's and receiver's scanners. The signer then determines the connected components that occur in the scanned image. The signer actually determines the connected components twice: a first time using a high gray level cutoff, and using a large component connectivity neighborhood, and a second time using a low gray level cutoff and a small component connectivity neighborhood.

In doing so, the signer identifies minimum and maximum boundaries for the connected components that might be extracted from the document image data obtained by the receiver. If a particular connected component formed in the first determination splits into two connected components in the second determination, that connected component in the signer's copy might break or split when determined by the verifier and/or receiver. The sender adds the bounding boxes for all ambiguous connected components to the assist channel.

The sender defines an ordered list of the connected components. Whenever the ordered list might be ambiguous to the receiver, that is, there is an ambiguity as to which connected component that should next appear in the ordered list, the sender adds hints to the assist channel that will assist the receiver in identifying the appropriate next connected component in the ordered list of connected components.

The sender then rounds the positions of the connected components to the nearest periodic discrete value. In various exemplary embodiments, the periodic discrete value may be an integer, such as 1, a fraction of an integer, such as $\frac{2}{5}$, or an integer multiple, such as 16. In various exemplary embodiments, this periodic discrete value is 16. Whenever the position value is close to a rounding boundary, the signer adds rounding hints to the assist channel to identify to the receiver whether to round up or round down. Then, the sender generates a hash value of all the rounded positions of the connected components in the document.

The sender next generates shape features of the connected components. The sender generates a hash value from the shape features. In various exemplary embodiments, the shape features are generated by convolving the individual connected components with a selected set of distinctive shape functions. The largest value in the convolution, which corresponds to a maximal match of shape function and component, is used in generating the hash value. Rounding hints are added to the assist channel if the values are close to a selection boundary between two different values.

The hash values and the assist channel are then digitally signed by the sender and/or the signer. The digitally-signed hash values and the assist channel are encoded into bar codes, glyph-blocks or the like. The bar codes, glyph blocks or the like are then printed on the document. The document is then transmitted to the receiver and/or to the verifier.

Upon receiving the document, the receiver and/or the verifier first attempts to verify that the sender or signer created the digital signature. If the digital signature is verified, then the verifier will generate a hash value based on the same elements or document features as used by the sender, using the information from assist channel. If the hash values generated by the receiver and/or the verifier are the same as those provided by the sender and/or the signer, then the document has not been altered during transmission. If the values are different, then the receiver and/or the verifier determine that the document has been altered since it was digitally signed by the signer.

FIG. 1 shows one exemplary embodiment of a document authentication device 100 implementing the systems and methods for document authentication according to this invention. As shown in FIG. 1, the document authentication device 100 includes an input/output interface 105, a controller 110, a memory 120, a document alignment circuit, routine or manager 125, a connected component generating circuit, routine or manager 130, a connected component information determining circuit, routine or manager 135, a splitting connected component determination circuit, routine or manager 140, a connected components ordering circuit, routine or manager 145, a hash value generating circuit, routine or manager 150, a data compressing circuit, routine or manager 155, a signature generating circuit, routine or manager 160, and a data appending circuit, routine or manager 170, interconnected by a control/data bus 115. As indicated above, it should be appreciated that the document alignment circuit, routine or manager 125 may be omitted.

The memory 120 includes a document image data portion 121, an assist channel portion 122 and a document features portion 123. It should be appreciated that these are functional and not physical portions of the memory 120. In various exemplary embodiments, the assist channel can include any one or more of a gray-level histogram, bounding boxes for connected components that may merge and/or split between the sender and the verifier, hints for ordering the connected components, rounding information for determining the positions of connected components and/or rounding information for determining the shapes of the connected components. In various exemplary embodiments, the hints for ordering the connected components includes the positions of the first connected component in a group or set of connected components. Then, for every component in a group or set, information about the connected components which are close to the boundary of its component neighborhood are included in the hints.

As shown in FIG. 1, an image data source 200, one or more input devices 300, a display device 400 and/or a printer 500 can be connected to the document authentication device 100 over links 205, 305, 405 and 505, respectively.

Figure 2:
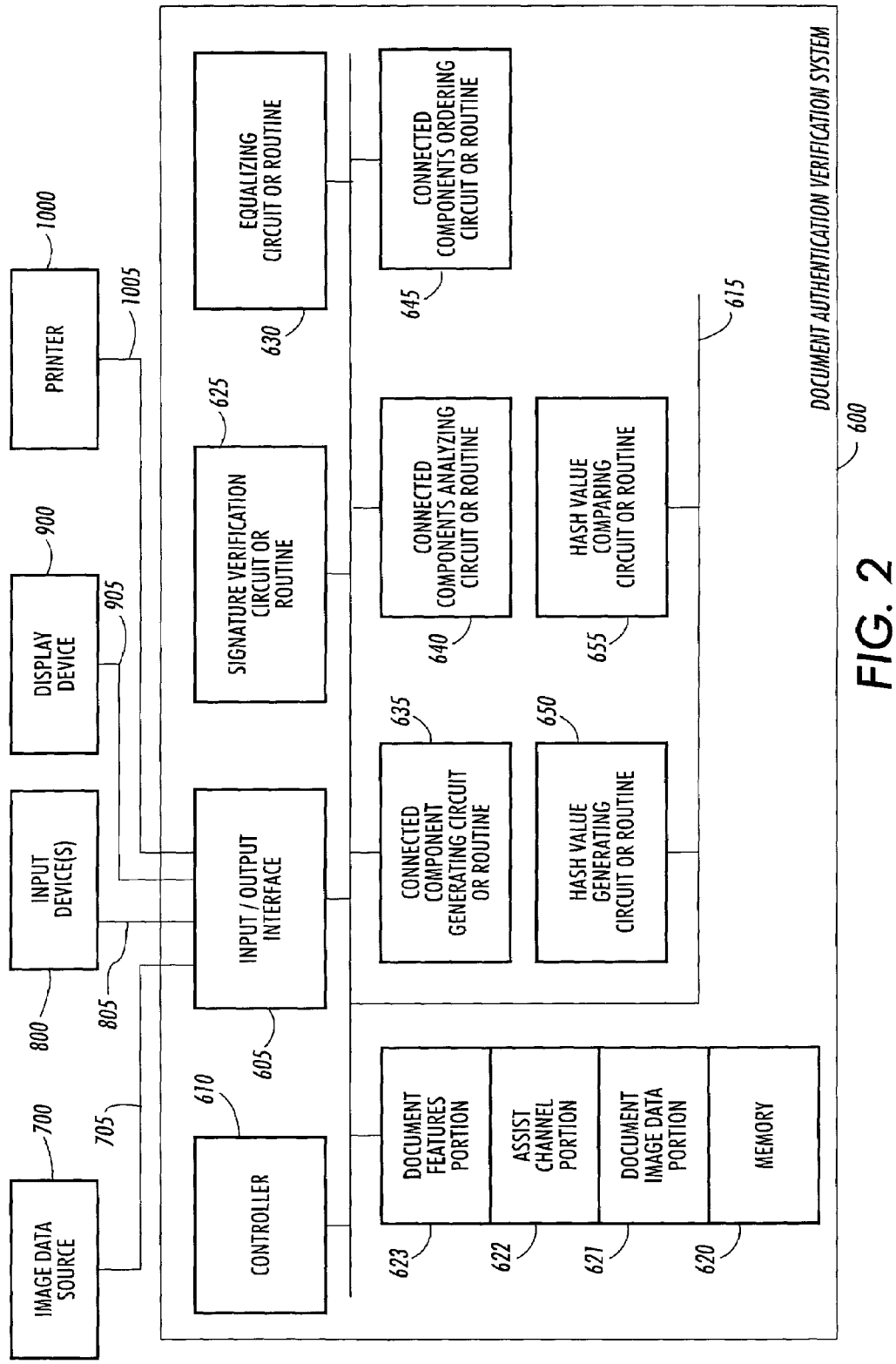
FIG. 2 is a block diagram of one exemplary embodiment of a document verification device according to this invention.

FIG. 2 shows one exemplary embodiment of a document verification device 600 implementing the systems and methods for document verification according to this invention. As shown in FIG. 2, the document verification device 600 includes an input/output interface 605, a controller 610, a memory 620, a signature verification circuit, routine or manager 625, an equalizing circuit, routine or manager 630, a connected components generating circuit, routine or manager 635, a connected components analyzing circuit, routine or manager 640, a connected components ordering circuit, routine or manager 645, a hash value generating circuit, routine or manager 650 and a comparing circuit, routine or manager 655, interconnected by a control/data bus 615.

As shown in FIG. 2, an image data source 700, one or more input devices 800, a display device 900 and a printer 1000 are connected to the document authentication device 600 over links 705, 805, 905 and 1005, respectively.

In general, the image data sources 200 and 700, shown in FIGS. 1 and 2, can be any one of a number of different sources, such as a scanner, a digital copier, a facsimile device that is suitable for generating electronic image data, or a device suitable for storing and/or transmitting electronic image data, such as a client or server of a network, or the Internet, and especially the World Wide Web. For example, the image data sources 200 and 700 may be scanners, or data carriers such as a magnetic storage disk, CD-ROM or the like, or host computers, that contain scanned image data.

In general, the image data sources 200 and 700 can be any known or later developed source that is capable of providing image data to the document authentication device 100 and the document verification device 600, of this invention respectively. It should be understood that the image data sources 200 and 700 do not need to be the same type of device.

The image data source 200 can be integrated with the document authentication device 100, such as in a digital copier having an integrated scanner. Alternatively, the link 205 connecting the image data source 200 to the document authentication device 100 can be a connection device, such as a modem, a local area network, a wide area network, and intranet, the Internet, any other distributed processing network, or any other known or later developed connection device. Similar relative connections may be made between the image data source 700 and the document verification device 600. Further, the image data source 700 is also adapted to provide a data file that is appended to the document by the signer. The appended data may be encoded using glyphs, a bar code, or any other known or later-developed technique for encoding data into a printed image.

Each of the links 205-505 and 705-1005 can be any known or later-developed device or system for connecting the respective devices to the document authentication device 100 and the document verification device 600, respectively, including a direct cable connection, a connection over a wide area network or a local area network, a connection over an intranet, a connection of the Internet, or a connection over any other distributed processing network or system. It should be appreciated that any of these connectors can be either wired or wireless. In general, each of the links 205, 305, 405, 505, 705, 805, 905 and 1005 can be any known or later-developed connection system or structure usable to connect the respective devices to the document authentication device 100 or the document verification device 600, respectively. It should be understood that the links 205, 305, 405, 505, 705, 805, 905 and/or 1005 do not need to be of the same type.

Each of the respective one or more input devices 300 and 800 may be any combination of one or more input devices, such as a keyboard, a mouse, a joy stick, a trackball, a touch pad, a touch screen, a pen-based system, a microphone and associated voice recognition software, or any known or later-developed device for inputting user commands to the document authentication device 100 and the document verification device 600, respectively. It should be understood that the respective one or more input devices 300 and 800 do not need to be the same types of devices.

Each of the display devices 400 and 900 may be monitors that are capable of displaying an electronic version of the resulting document image for viewing or displaying any other intermediary steps of the document authentication and verification process. The displays 400 and 900 are optional and thus may be omitted. It should be understood that the respective display devices 400 and 900 do not need to be the same type of device.

Each of the printers 500 and 1000 can be any known or later-developed image-forming device that is capable of printing a tangible copy of an image. It should be appreciated that the printer 1000 is optional. It should also be understood that the respective printers 500 and 1000 do not need to be the same type of device.

It should be appreciated that the image data source 200, the one or more input devices 300, the display 400, and the printer 500 do not have to be locally associated with the document authentication device 100. Furthermore, it should be appreciated that the document authentication device 100, and any one or more of the image data source 200, the one or more input devices 300, the display 400 and the printer 500 can be elements integrated into a single device, such as a photocopier or the like. Furthermore, it should also be appreciated that any number of these devices may be integrated into a single device to cooperate with the remaining devices. Similar relative arrangements may be made with the document verification device 600 and any one or more of the image data source 700, the one or more input devices 800, the display 900 and the printer 1000.

As shown in FIGS. 1 and 2, each of the memory 120 and the memory 620 can be implemented using any appropriate combination of alterable, volatile, or non-volatile memory or non-alterable, or fixed memory. The alterable memory, whether volatile, or non-volatile, can be implemented using any one or more of static or dynamic RAM, a floppy disk and disk drive, a writable or rewritable optical disk and disk drive, a hard drive, flash memory or the like. Similarly, the non-alterable or fixed memory can be implemented using any one or more of ROM, PROM, EPROM, EEPROM, and gaps an optical ROM disk, such as a CD-ROM or DVD-ROM disk, and disk drive or the like.

Each of the document authentication device 100 and the document verification device 600 can be implemented as software executing on a programmed general purpose computer, a special purpose computer, a microprocessor or the like. Alternatively, each of the document authentication device 100 and the document verification device 600 can be implemented as a routine embedded in a printer driver, as a resource residing on a server, or the like. Each of the document authentication device 100 and the document verification device 600 can also be implemented by physically incorporating that device into a software and/or hardware system, such as the hardware and software system of a printer or a digital photocopier. It should be understood that the document authentication device 100 and the document verification device 600 do not need to be implemented the same way.

It should also be understood that each of the circuits, routines or managers shown in FIG. 1 and FIG. 2 can be implemented as portions of a suitably programmed general-purpose computer. Alternatively, each of the circuits, routines or managers shown in FIG. 1 and FIG. 2 can be implemented as physically distinct hardware circuits within an ASIC, using a digital signal processor (DSP) or using a FPGA, a PDL, a PLA and/or a PAL, or using discrete logic elements or discrete circuit elements. The particular form each of the circuits, routines or managers shown in FIG. 1 and FIG. 2 will take is a design choice and will be obvious and predicable to those skilled in the art. It should be appreciated that the circuits, routines or managers shown in FIGS. 1 and 2 do not need to be of the same design.

When operating the document authentication device 100, a user instructs the document authentication device 100 through one or more of the one or more input devices 300 over the link 305 to notarize or authenticate a document, as shown in FIG. 1. An image of the document to be notarized or authenticated is received by the document authentication device 100 from the image data source 200 via the link 205 at the input/output interface 105. The input/output interface 105 inputs the input image data, and, under direction of the controller 110, forwards it to the document image data portion of the memory 120.

The document alignment circuit, routine or manager 125 receives the document image data from the memory 120 under the control of the controller 10 and geometrically aligns the document image data. In various exemplary embodiments where it is used, the document alignment circuit, routine or manager 125 either locates a set of alignment marks in the image data, or locates features of the image itself. Then, based on the located alignment marks or image features, the document alignment circuit, routine or manager 125 rescales or maps the alignment marks or image features in the document image data to a predetermined set of locations. The document alignment circuit, routine or manager 125 then accordingly rescales or maps the rest of the image data based on the new locations of the alignment marks or image features.

In various exemplary embodiments, if the image data does not initially contain any alignment marks, the document alignment circuit routine or manager 125 can append alignment marks to the document image data so that the verifier will be able to rescale the received image data to the same relative coordinates. For example, in various exemplary embodiments, the document alignment circuit, routine or manager 125 can append four black dots to the document image data. In this case, one dot can be positioned in each corner of the document image.

In any case, when used, the document alignment circuit, routine or manager 125 stores the modified image data, under control of the controller 110, into the document image portion 121, either in place of or in addition to, the original image data. The rest of the circuit elements of the document authentication device 100 operate on the image data stored in the document image portion 121, whether it is the original image data or modified image data. The document alignment circuit, routine or manager 125 then generates a gray level histogram from the image data stored in the document image portion 121. Under control of the controller 110, the alignment circuit, routine or manager 125 stores the determined gray level histogram in the document features portion 123 of the memory 120.

In particular, it is desirable that both the document to be authenticated and the document to be verified are scanned at the same resolution and scanned using the same mode, i.e., to generate either binary image data, gray-scale image data, full color image data, or the like. In various exemplary embodiments, the image is desirably scanned at 300 (dpi) using a gray-scale mode. If implemented, the document alignment circuit, routine or manager 125 then geometrically aligns the images using the alignment marks or the selected image features. In various exemplary embodiments, the image is rescaled to a new resolution and new dimensions, while desirably maintaining the correct aspect ratio. In general, the centers of the alignment marks or the selected image features are mapped onto the corners or edges or other desired location, as appropriate, of the limits of the new image. The remaining pixels are then interpolated from the scan data. The remaining pixels are interpolated to avoid any aliasing effects.

The connected components generating circuit, routine or manager 130 then retrieves the image data from the image data portion 121 of the memory 120 under control of the controller 110 and analyzes that image data to determine each of the connected components within that image data. A connected component is a grouping of pixels that are at least as dark as a given grayscale value and that are within a given proximity of each other. In various exemplary embodiments, the connected components generally represent recognizable characters, line art elements, and the like. The determined connected components are stored in the document features portion 123 of the memory 120 by the connected components generating circuit, routine or manager 130 under control of the controller 1110.

The determined connected components stored in the document features portion 123 of the memory 120 are then output, under control of the controller 110 to the connected component information determining circuit, routine or manger 135, the splitting connected components determining circuit, routine or manager 140, the connected component ordering circuit, routine or manager 145 and/or the hash value generating circuit, routine or manager 150. Alternatively, the connected component generating circuit, routine or manager 130 can directly output, under control of the controller 110, the determined connected components to the connected component information determining circuit, routine or manger 135, the splitting connected components determining circuit, routine or manager 140, the connected component ordering circuit, routine or manager 145 and/or the hash value generating circuit, routine or manager 150 as well as to the document features portion 123 of the memory 120.

In various exemplary embodiments, the connected components generating circuit, routine or manager 130 determines the connected components by finding a pixel having an image value that is nearly black and that is not in any previously-determined connected component. In various exemplary embodiments, for image data having a bit depth of 8 bits, which yields 256 different gray values, and assuming an image value of 0 is black and an image value of 255 is white, a near-black pixel corresponds to pixels having image values of about 80 or less.

Once the connected components generating circuit, routine or manager 130 locates such a near-black pixel, the connected components generating circuit, routine or manager 130 then identifies all pixels having a predetermined value relative to the black value that represents a minimum gray value. In various exemplary embodiments of the connected component generating circuit, routine or manager 130 of the document authentication device 100, this value is 150 for 8-bit gray values and black being equal to zero.

Additionally, those pixels within the predetermined value of the black value must also lie within a neighborhood around the selected pixel or some previously identified added pixel. As shown, in FIG. 11, this neighborhood for the connected component generating circuit, routine or manager 130 of the document authentication device 130 is indicated by the pixels labeled both S and V around a pixel of interest X. The pixel of interest X can be either the initial near-black pixel having an image value of about 80 or less, or a pixel that was in the neighborhood around the initial near-black pixel and that has a value of about 150 or less that was subsequently added to the current connected component.

Figure 11:
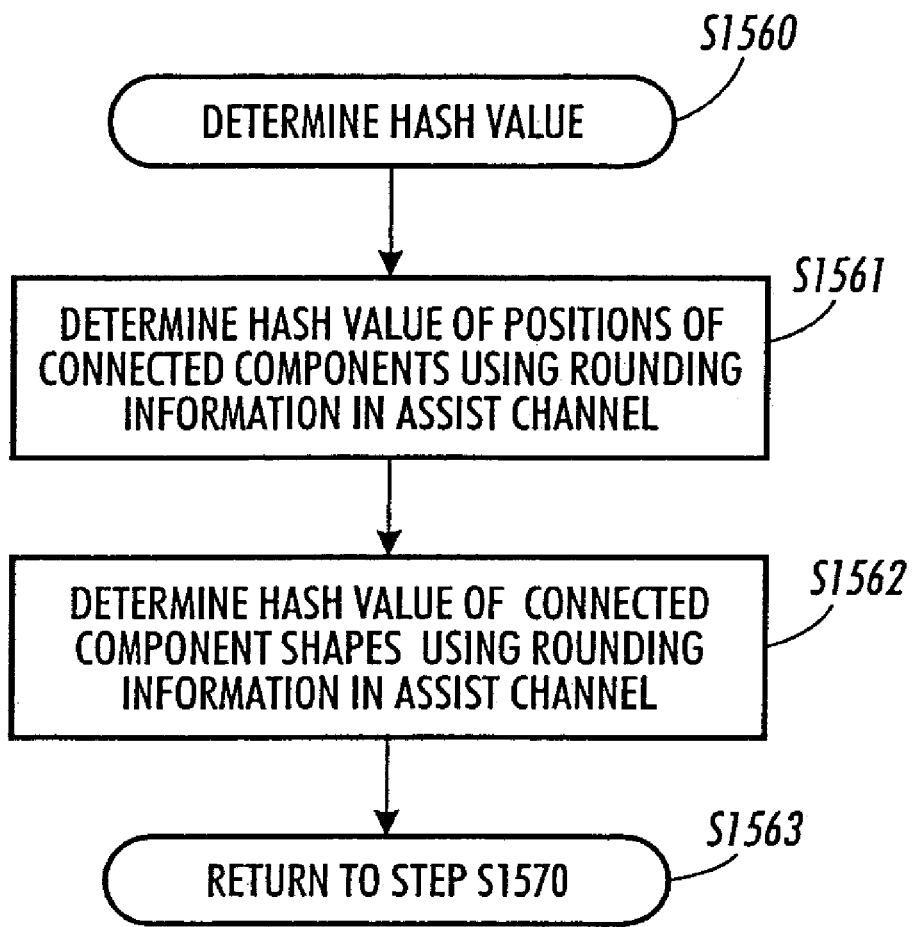
FIG. 11 is a flowchart outlining in greater detail one exemplary embodiment of the method for ordering the connected components based on the data contained in the appended information according to this invention.

Because the connected components generating circuit, routine or manager 130 uses an extensive neighborhood, the neighborhood definition for the connected components generating circuit, routine or manager 130, as shown in FIG. 11, tends to merge connected components that are closely adjacent to each other. In particular, the connected component generating circuit, routine or manager 130 tends to more readily merge the image into connected components than will the connected components generating circuit, routine or manager 635 of the document verification device 600. The connected components generating circuit, routine or manager 130 is biased in this way because it is relatively easy for the document verification device 600 to merge two previously separate connected components. In contrast, it is exceedingly difficult for the connected components generating circuit, routine or manager 635 of the document verification device 600 to split a connected component into two in exactly the same way that the connected components generating circuit, routine or manager 130 initially generated the two separate connected components.

The connected component information determining circuit, routine or manager 135 inputs the determined connected components and determines and outputs connected component information about the determined connected components to the memory 120 to be stored in the assist channel portion 122 under control of the controller 110. In various exemplary embodiments, the determined connected component information includes centroid locations of small connected components. In various exemplary embodiments, a small connected component is a connected component comprising about 15 pixels. In other various exemplary embodiments, the determined connected component information includes bounding boxes for large connected components. In various exemplary embodiments, large connected components are connected components comprising about 10,000 pixels or more.

One way in which noise is introduced into scanned images is the addition of small connected components in repeated scans of a single document, i.e., in the third or fourth generation of a scanned document. Thus, it is desirable, but not necessary, that the document authentication device 100 and the document verification device 600 agree on the small connected components that are present in the document. Accordingly, the connected component information determining circuit, routine or manager 135 of the document verification device 100 identifies all small connected components that have at most a first small number of pixels. In various exemplary embodiments, this first small number is about 15 pixels. The connected component information determining circuit, routine or manager 135 then identifies the centroids of all such small connected components and adds the determined centroids to the assist channel stored in the assist channel portion 122 or to the document features stored in the document features portion 123.

The connected component information determining circuit, routine or manager 135 also identifies and generates information on all connected components that include at least a first large number of pixels. In various exemplary embodiments, the first large number is about 10,000 pixels. Such large components are treated separately primarily because the bounding box, i.e., the minimal rectangular box that fully encloses all portions of a single connected component, might, and probably will, overlap with one or more other connected components and/or the bounding boxes for such other connected components. If this is not taken into consideration, such overlapping could lead to errors in the verification process when matching bounding boxes or centroids during verification. It should be appreciated that, in various other exemplary embodiments, these same class of connected components could be identified by determining how many other bounding boxes for other connected components the bounding box of a large connected component overlaps with.

The splitting connected components determining circuit, routine or manager 140 also inputs the determined connected components. For each determined connected component, the splitting connected component determining circuit, routine or manager 140 determines if that connected component is likely to be recognized as a single connected component, or as two or more distinct connected components, by a subsequent verification process or device. The splitting connected components determining circuit, routine or manager 140 outputs the bounding boxes of all of the determined connected components, which are determined by the splitting connected components determining circuit, routine or manager 140 to be likely to split during verification into two or more distinct connected components, to the memory 120 under control of the controller 110 to be stored in the assist channel portion 122.

As indicated above, the document authentication device 100 more aggressively combines pixels into a single connected component by using a more liberal neighborhood definition, as shown in FIG. 11. As a result, as outlined above, a single connected component as identified by the document authentication system 100 may be determined to be two, or even more, connected components by the document verification device 600. The splitting connected components determining circuit routine or manager 140 thus determines which connected components that were determined by the connected component generating circuit, routine or manager 130 as a single connected component could be determined by the document verification device 600 as two or more connected components.

In particular, the splitting connected components determining circuit, routine or manager 140 redetermines the connected component from a currently selected initial pixel, which has a value of about 80 or less, using a threshold of about 80 or less to identify the rest of the pixels for this connected component, rather than the previous threshold of about 150 or less. The splitting connected components determining circuit, routine or manager 140 also uses the smaller neighborhood definition that will be used by the document verification device 600. As shown in FIG. 11, the smaller neighborhood includes only those pixels labeled V around the pixel of interest X.

If the new connected component generated for the current initial pixel, whether generated by the splitting connected components determining circuit, routine or manager 140 or the connected component generating circuit, routine or manager 130, is significantly smaller than the previously-generated connected component based on the more relaxed threshold and the larger neighborhood, then the splitting connected components determining circuit, routine or manager 140 identifies this connected component as one that is likely to be split between two or more separate connected components generated by the document verification device 600. It should be appreciated that, in various exemplary embodiments, one connected component is defined as significantly smaller than another connected component when the difference in the number of pixels contained in each of the two connected components that have values of 80 or less is at least about 5 pixels.

It should also be appreciated that one or more of the connected components generating circuit, routine or manager 130, the connected components information determining circuit, routine or manager 135 and/or the splitting connected components determining circuit, routine or manager 140 determines, in various exemplary embodiments, any connected components whose bounding box lies entirely within the bounding box of an already-marked connected components after the bounding box of that already-marked connected component is extended by 5 pixels in each direction. The information generated by the connected components generating circuit, routine or manager 130, the connected components information generating circuit, routine or manager 135 and/or the splitting connected components determining circuit, routine or manager 140 is stored in one or both of the assist channel stored in the assist channel portion 122 or the document features stored in the document features portion 123.

The connected components ordering circuit, routine or manager 145 also inputs the determined connected components. The connected components ordering circuit, routine or manager 145 generates an ordered list of the determined connected components and outputs to the assist channel portion 122 of the memory 120, under control of the controller 110, the ordered list and any information and/or hints on how to reconstruct the ordered list of the determined connected components. Alternatively, the connected components ordering circuit, routine or manager 145 outputs the ordered list of connected components directly to the hash value generating circuit, routine or manager 150. In various exemplary embodiments, the connected component ordering circuit 145 combines the connected components into groups of connected components when generating the ordered list.

The connected components ordering circuit, routine or manager 145 orders the connected components as outlined below. The connected components ordering circuit, routine or manager 145 additionally extracts sufficient information, which is stored in either the assist channel or the document features portion, such that the document verification device 600 can reconstruct the ordering of the connected components so that the reconstructed ordering is generally identical to the ordering generated by the connected components ordering circuit, routine or manager 145.

In various exemplary embodiments, the ordering is determined based on groups or sets of connected components. First, the connected components ordering circuit, routine or manager 145 locates the top-left-most connected component that has not yet been ordered and/or collected into a group or set that has been ordered. The connected components ordering circuit, routine or manager 145 then stores the centroid, in this case meaning the center of mass, of that selected top-left-most, not-yet-ordered connected component to either the assist channel stored in the assist channel portion 122 or the document features portion stored in the document features portion 123.

The selected top-left-most, not-yet-ordered connected component is then pushed onto a first in, first out (FIFO) queue. The connected components ordering circuit, routine or manager 145 then processes the connected components in the queue until the queue is empty. The connected components ordering circuit, routine or manager 145 processes the connected components from the queue by extracting a next connected component from the queue and adding that extracted connected component to an ordered list stored in the memory 120. The order in which the connected components appear in the queue is precisely the order that is needed by the document verification device 600. In response to the connected components ordering circuit, routine or manager 145 extracting a connected component from the first-in, first-out queue, all elements in the neighborhood of that extracted connected component are also added to the queue, so long as such connected components have not already been placed into the queue, or have not already been ordered relative to a previously-extracted connected component. Thus, the neighborhoods define the sets or groups that the connected components are grouped into.

In general, a second connected component is in the neighborhood of a first, extracted connected component if the second connected component meets one of three criteria relative to the extracted connected component. In a first criterion, the second connected component is in the neighborhood of the first connected component if the maximal y-coordinate of the second connected component is less than the maximal y-coordinate of the extracted connected component and the x-overlap between the second connected component and the first connected component is at least about 83%. It should be appreciated that, in this case, the x-overlap of two connected components is a percentage of the overlap of a projection of the bounding boxes of those two connected components onto the x-axis, relative to the smaller width of the two connected components. Thus, if the x-axis length of the smaller of the two connected components is 9, while the x-axis length of the larger of the two connected components is 11, and the overlap between the two connected components is 8, the x-overlap is 8/9, or 88%. In this exemplary embodiment, the x-overlap is not 8/11, or 73% although that value could be used to create a less restrictive neighborhood.

In the second criterion, the second connected component is in the neighborhood of the extracted or first connected component if the minimal y-coordinate of the second connected component is at most about 5 pixels below the maximal y-coordinate of the extracted connected component and if the x-overlap of the second connected component with the extracted connected component is about 85% or more. In the third criterion, the second connected component is in the neighborhood of the extracted or first connected component if the minimal x-coordinate of the second connected component is at most about 300 pixels to the right of the extracted connected component and if the y-overlap of the second connected component with the extracted connected component is at least about 20% and is at least about 2 pixels. It should be appreciated that the y-overlap is defined in the same way as the x-overlap, except that a projection along the y-axis is used instead of the projection along the x-axis. It should be appreciated that these criteria can be more qualitatively defined as defining situations where the second connected component is directly above, directly below, or a few pixels to the right of the extracted connected component.

After the set or group of second connected components that lie in the neighborhood of the extracted connected component are identified, those connected components in the neighborhood are sorted. In particular, in various exemplary embodiments, the second connected components in the neighborhood in this set or group are sorted by first identifying those second connected components that lie above the extracted connected component based on the x-coordinates of these second connected components. Then, the second connected components in this set or group are sorted by identifying those second connected components that lie below the extracted connected component. Again, these second connected components are sorted by the x-coordinates of these second connected components. Then, the second connected components in this set or group that lie to the right of the extracted connected components are identified and sorted, again by the x-coordinate of these second connected components.

It should be appreciated that, in various exemplary embodiments, if two of the second connected components are above each other, meaning that the x-coordinates of the centroids of these two connect components differ by at most about 4 pixels, then the second connected component that is on top is sorted first. As pointed out, these second connected components that lie in the neighborhood around the extracted connected component includes only those connected components that were not previously placed into the queue. Accordingly, once the second connected components are ordered, they are also placed into the queue. It should also be appreciated that every time a neighborhood around an extracted connected component is generated, the positions of all of the connected components that are still within, but on the border of the neighborhood, are transmitted to the document verification device as part of the assist channel or the document features channel.

In various exemplary embodiments, the bounding boxes are sorted first by maximal y-coordinate, and then by height. Then one or more of all minimal .x-coordinates, all maximal y-coordinates, all widths, and all heights of the bounding boxes can be added to the assist channel.

The hash value generating circuit, routine or manager 150 inputs the ordered list of the determined connected components from the memory 120 and determines a hash value based on the input ordered list of the determined connected components. The hash value generating circuit, routine or manager 150 outputs the hash value to the memory 120, under control of the controller 110, to be stored in the document features portion 123. The hash value generating circuit, routine or manager 150 outputs information and/or hints on how to obtain the correct hash value to the memory 120, under control of the controller 110, to be stored in the assist channel portion 122. In various exemplary embodiments, the information and/or hints include rounding hints regarding the positions and/or the shapes of the connected components.

In various exemplary embodiments, the hash value generating circuit, routine or manager 150 determines a hash value using any known or later-developed hashing technique. In various exemplary embodiments, the hash value generating circuit, routine or manager 150 determines the hash value using a sequential hashing technique. In various exemplary embodiments, the hash circuit, routine or manager 150 determines the hash value based on the positions of the connected components. In various other exemplary embodiments, the hash circuit, routine or manager 150 determines a hash value based on the shape of the connected components instead of, or in addition to, the positions of the connected components.

In various exemplary embodiments, the hash value generating circuit, routine or manager 150 determines a cryptographically secure hash value of all positions of the connected components identified by the connected component generating circuit, routine or manager 130. In general, the hash value generating circuit, routine or manager 150 rounds the coordinates of the centroid of each such identified connected component to the nearest multiple of a periodic discrete value. In various exemplary embodiments, this periodic discrete value is 16. The hash value generating circuit, routine or manager 150 then hashes the resulting rounded position values, for example, by using a sequential hash function. At the same time, the hash value generating circuit, routine or manager 150 generates rounding hints for those connected components whose centroids are within a small range around the half value for the periodic discrete value.

For example, if the periodic discrete value is 16, the hash value generating circuit, routine or manager 150 generates rounding hints if the modulo-16 value of the position of the centroid is between 6 and 9. This rounding hint is then added to the assist channel stored in the assist channel portion 122. In various exemplary embodiments, the rounding hint indicates that the document verification system 600 should add one-half value of the periodic discrete value to the position value for the centroid for that connected component before rounding as a rounding offset. When the predetermined value is 16, the half-value or rounding offset is 8. In various exemplary embodiments, if a hint is provided for some connected components to add the rounding offset before rounding, a do-nothing symbol, which could also be interpreted as a round to nearest multiple of the periodic discrete value instruction, can also be added to the assist channel stored in the assist channel portion 122.

In various exemplary embodiments, after the hash value generating circuit, routine or manager 150 has generated the hash value based on the rounded positions of the connected components, the hash value generating circuit, routine or manager 150 then generates a cryptographically secure hash value based on the shapes of the various connected components. In various exemplary embodiments of this invention, a number of previously chosen functions, whose shapes are represented in FIG. 12, are convolved with each connected component.

It should be appreciated that, in various exemplary embodiments of the systems and methods according to this invention, a connected component can be regarded as a density function in the image plane. It should also be appreciated that, when the image data is gray scale data, this density function is not a simple binary function. In convolving the shape functions shown in FIG. 12 with each connected component, the two functions are aligned in a plurality of different possible ways by moving one of the two functions horizontally, vertically or rotationally, or using a combination of these movements. Then, the shape function is multiplied with the connected component on a pixel-by-pixel basis. Then, the sum is generated over all of these products.

Figures 12, 13:
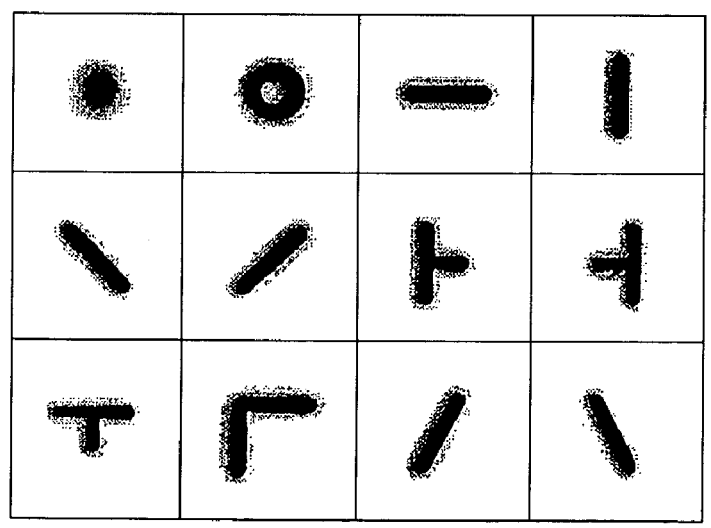
FIG. 12 illustrates one exemplary embodiment of the neighborhoods used to create the gray scale connected components according to this invention.
FIG. 13 is a chart displaying exemplary shape convolution functions.

For each of the different functions shown in FIG. 12, the alignment which gives a maximal value of this sum for a particular connected component is identified as the shape value $S_v$ for that connected component. More formally:

$$S_v = \max_{x,y \in Z} \frac{\sum_{i,j \in Z} f(i,j) \cdot g(i+x, j+y)}{\sum_{i,j \in Z} g(i,j)} \quad (1)$$

where:
f represents the connected component's density function;
g represents the density function of the selected one of the shape functions; and
$S_v$ is the value of the shape function.

The value of the shape function $S_v$ is then divided by a predetermined number to yield a number in a predefined range. This number in the predefined range is then hashed. Of course, if the number in the predefined range is close to be a multiple of the predefined value, appropriate rounding hints are incorporated into the assist channel stored in the assist channel portion 122. In various exemplary embodiments, this predetermined value is 64, yielding a range of 0-3 for the number. The convolutions for each connected component/shape pair are then hashed. The hashing function performed by the hashing value generating circuit, routine or manager 150 with respect to the shape function is described in further detail below with respect to FIG. 12.

The data compressing circuit, routine or manager 155, under control of the controller 110, inputs at least some of the information and/or hints stored in the assist channel portion 122 of the memory 120 and compresses at least some of the data contained stored in the assist channel portion 122. The data compressing circuit, routine or manager 155 can use any known or later-developed compression technique when compressing the at least some of the data in the assist channel portion 122.

It should be appreciated that the information stored in the assist channel portion 122 and the document features portion stored in the document features portion 123 includes one or more of least a gray level histogram, the bounding boxes, at least for the connected components that could differentially split and/or merge between the document verification system and the document authentication system and one or more of at least ordering hints, position rounding hints and shape rounding hints stored in the assist channel. This data, which must be incorporated onto the document, should be encoded and compressed to minimize the area on the document that is required to fit all this data. In various exemplary embodiments, the data is printed as bar codes, glyphs or the like.

In various exemplary embodiments, the gray-level histogram is compressed by encoding the histogram. In various exemplary embodiments, all frequency counts in the histogram are divided by 256. Then, the frequency counts are packed into a bitstream using the B-packing method. In B-packing, values less than 128 are packed into one byte, and other values are packed into two bytes, with the highest order bit of the first byte being set. In various exemplary embodiments, the resulting bitstream is further compressed using gzip. Gzip is a conventional Unix-based compression program that uses a standard Lempel-Ziv compression algorithm.

In various exemplary embodiments, to compress the bounding boxes, the x-coordinates of the bounding boxes are not compressed. In various exemplary embodiments, the y-coordinates of the bounding boxes are sorted and then Δ-coded. In Δ-coding, the first y-coordinate is provided as is. Then, for each successive y-coordinate, the difference between that y-coordinate and the previous y-coordinate is provided. The resulting stream for the y-coordinates is then B-packed, as outlined above. The resulting stream is then compressed using gzip. In various exemplary embodiments, the width and height of the boundary boxes are also B-packed and compressed using gzip.

In various exemplary embodiments, the hints for ordering the connected components includes the positions of the first connected component in a group or set of connected components. Then, for every component in a group or set, information about the connected components which are close to the boundary of its component neighborhood are included in the hints.

In various exemplary embodiments, compressing the hints for ordering the connected components includes B-packing the first connected component of each group or set. In various exemplary embodiments, the x-coordinates are B-packed as they are, and the y-coordinates are B-packed, after the y-coordinates are sorted and then Δ-coded. Both the x and y coordinates are the compressed using gzip. In various exemplary embodiments, the number of ambiguous components in a component neighborhood are compressed using arithmetic coding. The positions of the ambiguous components are added to the assist channel as offsets from the position of the connected component whose component neighborhood is determined. In various exemplary embodiments, 8 bits are used for the x-difference of the positional offset. In various exemplary embodiments, 10 bits are used for the y-difference of the positional offset.

In various exemplary embodiments, the rounding information for determining the positions of connected components is compressed using arithmetic coding, separately for the x-and the y-coordinates.

In various exemplary embodiments, the rounding information for determining convolutions against the standard shapes is compressed using any conventional or later developed compression techniques. In other various exemplary embodiments, this rounding information is not compressed.

The signature generating circuit, routine or manager 160 inputs data stored in the document features portion 123 and data stored in the assist channel portion 122 of the memory 120 and digitally signs one or both of these sets of data. The digitally signed document feature data and/or the digitally signed assist channel data are then output, under control of the controller 110, to the memory 120. In various exemplary embodiments, the signature generating circuit routine or manager 160 uses any known or later-developed digital signing technique. In various exemplary embodiments, the signature generating circuit, routine or manager 160 uses a known encryption technique to digitally sign the document data file. It should be understood that the signature generating circuit routine or manager 160 can optionally be omitted from the document authentication device 100.

The data appending circuit, routine or manager 170 inputs at least some of the data stored in the document features portion 123 and/or in the assist channel portion 122, or the digitally signed versions of one or more of these data items, and appends the input data to the document image data or directly to the original document itself. In various exemplary embodiments, the data appending circuit routine or manger 170 converts the data in the document features portion and/or in the assist channel portion into a format, such as, but not limited to, data glyphs or bar codes, that is machine readable.

In various exemplary embodiments, the data appending circuit routine or manager 170 adds the appended data, whether in machine-readable format or human-readable format, to the document image data stored in the document image data portion 121. In this case, a tangible copy of the digitally signed document is generated by printing the document image data stored in the document image data portion 121. Alternatively, the data appending circuit, routine or manager 170, under control of the controller 110, appends the machine-readable or human-readable data to the original tangible copy of the document. In this case, the user places the original tangible copy of the document on the printer 500. The printer 500 then receives the appended machine-readable or human readable data from the document authentication device 100 over the link 505. The appended data is then added to the original tangible copy of the document.

It should also be appreciated that this same procedure can be used to append the alignment marks to the original tangible copy of the document before the document image data is obtained from the image source 200, so that the document image data used by the document alignment generating circuit, routine or manager 125 and the subsequent element of the document authentication device 100 includes the alignment marks.

When operating the document verification device 600, a user instructs the document verification device 600 through one or more of the one or more input devices 800 over the link 805 to verify a document, as shown in FIG. 2. The document to be verified includes appended data that has been digitally signed and that includes document features and/or an assist channel. Document image data of the document to be verified is received by the document verification device 600 from the image data source 700 via the link 705 and the input/output interface 605. The input/output interface 605 inputs the input image data, and under direction of the controller 610, forwards the received document image data to the document image data portion 621 of the memory 620.

The signature verification circuit, routine or manager 625 inputs the digitally signed appended data to verify the digital signature used to digitally sign the appended data is the correct digital signature for the purported signer of the document. The signature verification circuit, routine or manager 625 can use any known or later-developed digital signature verification technique to verify that the digital signature used to digitally sign the appended data is that of the purported signer.

If the digital signature is that of the purported signer, then the document verification device 600 has verified that the purported signer actually signed and created the digitally-signed appended data. In this case, the document verification device 600 can proceed, by verifying that the received document is substantially identical to the document digitally signed by the signer in essentially all significant respects by determining one or more hash values from the received document image data based on the information contained in the appended data and comparing the one or more verification hash values to the signer's corresponding one or more hash values contained in the appended data.

In contrast, in various exemplary embodiments, if the digital signature is not that of the purported signer, the document verification device 600 stops the verification process on that document. Alternatively, assuming the appended data can be decrypted in view of any encryption applied to it, the appended data is analyzed as outlined above to verify that the content of the document is substantially identical to the content of the signed document. However, in this case, the document is flagged as having an unverified signature.

The appended data is then decoded from the machine-readable format into at least one of a document features portion and an assist channel. The assist channel portion of the appended data is stored into an assist channel portion 622 of the memory 620. The document features portion of the appended data is stored into a document features portion 623 of the memory 120.

The document features portion of the appended data includes at least the gray level histogram of the original document image data used by the document authentication device 100 and the bounding boxes for all determined ambiguous connected components, as well as the hash values determined from hashing the values of the positions and the shapes of the connected components.

Like the document authentication device 100, in most cases, the document verification device 600 has obtained the document image data to be verified by scanning a tangible copy of the document containing the appended document features data and assist channel data. In general, to be able to use the data stored in the document features and assist channel portions, the document, after scanning by the document verification system 600, is desirably as nearly identical as possible to the document scanned and processed by the document authentication system 100. Accordingly, it is generally desirable to scan the tangible copy for the document verification device 600 using the same general modes as that used by the document authentication device 100. Thus, using the example outlined above with respect to the document authentication device 100, the document verification device also scans the image at 300 (dpi) in an 8-bit gray-scale mode where 0 is black and 255 is white.

The equalization circuit, routine or manager 630 inputs the document image data and locates the alignment marks, if present, in the image data. Based on the located alignment marks, or selected image features as outlined above, the equalization circuit, routine or manager 630 rescales or maps the located alignment marks to predetermined positions, and accordingly rescales or maps the remaining image data to create modified image data. In various exemplary embodiments, the equalization circuit, routine or manager 630 maps the centers of the alignment marks or selected image features onto the appropriate corners or edges of the higher resolution boundaries for the image data, or other desired features, that were used during remapping of the scanned notarized or authenticated tangible copy of the document. As in the document authentication device 100, the remaining pixels in the document to be verified are interpolated from the scanned data to avoid aliasing effects. The modified image data is then stored in the document image data portion 621 in place of the original image data. Of course, it should be appreciated that this alignment procedure will be omitted if it was omitted during authentication.

Then, the equalization circuit, routine or manager 630 extracts the gray level histogram from the document feature portion 623 and adjusts the image values of the image data stored in the document image data portion 621 based on the gray level histogram to create adjusted image data from that image data. The equalization circuit, routine or manager 630 equalizes the brightness in that image data based on the gray scale histogram stored in the document features portion of the appended data. By equalizing the image data stored in the document image data portion 621, the equalization circuit, routine or manager 630 compensates for any brightness differences resulting from using different scanners or other image data sources between scanning the tangible copy of the document to be authenticated by the document authentication device 100 and scanning the tangible copy of the authenticated document using the document verification device 600.

The equalization circuit, routine or manager 630 then outputs, under control of the controller 610, the adjusted document image data to the document image data portion 621 of the memory 620. In various exemplary embodiments, the equalization circuit, routine or manager 630 additionally or alternatively outputs the adjusted document image data directly to the connected component generating circuit, routine or manager 635 under control of the controller 610.

The connected component generating circuit, routine or manager 635 inputs the adjusted document image data and analyzes the adjusted document image data to determine the connected components within the adjusted document image data. The determined connected components are stored in the document feature portion 623 of the memory 620 under control of the controller 610. In various exemplary embodiments, the connected components circuit, routine or manager 635 additionally or alternatively outputs the determined connected components to the connected component analyzing circuit, routine or manger 640, the connected component ordering circuit, routine or manager 645 and/or the hash circuit, routine or manager 650.

The connected component generating circuit, routine or manager 635, like the connected component generating circuit, routine or manager 135, determines the connected components present in the adjusted image data. However, the connected component generating circuit, routine or manager 635 generates the connected components using slightly different values than those used by the connected component generating circuit, routine or manager 135. In particular, the connected component generating circuit, routine or manager 635 also begins by identifying a pixel having a value of about 80 or less that is not currently in a connected component, assuming black is 0. However, the connected component generating circuit, routine or manager 635 adds only those pixels to the current connected components that have an image value of about 130 and that lie in a neighborhood around either the initial pixel of the current connected component or a previously added pixel of the current connected component using the neighborhood shown in FIG. 11 corresponding to the pixels labeled V.

That is, the connected component generating circuit, routine or manager 635 uses a smaller neighborhood and a narrower threshold when generating the connected components relative to the connected component generating circuit, routine or manager 135. In particular, this tends to result in connected components that are smaller and more compact than the connected components generated by the connected component generating circuit, routine or manager 135. As a result, the combination of different thresholds and different neighborhood definitions tends to keep separate connected components generated by the connected component generating circuit routine or manager 635 that were merged into a single connected component by the connected component generating circuit, routine or manager 135. Based on experiments performed by the inventors, using these thresholds and neighborhood definitions, no situations were encountered where the connected component generating circuit, routine or manager 635 generated a single connected component while, using the same data, the connected component generating circuit, routine or manager 135 of the document verification device 100 generated two or more connected components.

As indicated above, it is relatively simple to merge connected components, while it is exceedingly difficult to consistently split such connected components. For example, if the connected component analyzing circuit, routine or manager 640 is provided with only a single connected component at a certain position, but is advised by information in the document features portion or the assist channel that there should be 7 connected components at that certain location, there is no obvious way for the connected component analyzing circuit, routine or manager 640 to figure out how to cut that connected component into 7 pieces in such a way that there would be no errors relative to the connected components generated by the connected component generating circuit, routine or manager 135.

The connected component analyzing circuit, routine or manager 640 inputs the determined connected components, as well as data from the assist channel. The connected component analyzing circuit, routine or manager 640 analyzes each determined connected component in view of the assist channel data stored in the assist channel portion 622 to ensure that the connected components generally match the connected components that were determined from the original document image data by the document authentication device 100 and used by the document authentication device 100 to generate the appended hash values.

In various exemplary embodiments, the assist channel data includes connected component information from the sender. In various exemplary embodiments, the connected component information includes centroid locations of small connected components identified by the document authentication device 100. In various exemplary embodiments, the connected component information includes bounding boxes for the large connected components identified by the document authentication device 100. In various exemplary embodiments, the connected component information includes bounding boxes for all connected components that were determined by the document authentication device 100 to be connected components that were likely to be split into two or more distinct connected components when the document verification device 600 generates the connected components from the received documents image data.

As indicated above, the connected component analyzing circuit, routine or manager 640 determines, based on the appended data in either the data features and/or the assist channel, how to split a connected component. However, before doing this, the connected component analyzing circuit, routine or manager 640 analyzes the generated connected components in an attempt to make the list of connected components as identified by the document verification device 600 correspond as closely as possible, if not perfectly, with the list of connected components generated by the document authentication device 100.

As indicated above, in various exemplary embodiments, the centroids of all connected components having at most a first small number of pixels are provided in the document features portion. In various exemplary embodiments, this first small number is about 15 pixels. The connected component analyzing circuit, routine or manager 640 identifies all connected components having a second small number that is larger than the first small number. In various exemplary embodiments, this second small number is at most about 20 pixels for a first small number of 15. The connected component analyzing circuit, routine or manager 640 then tries to match each of the just-identified connected components with one of the centroids provided from the document authentication device 100 through the assist channel. Any unmatched connected component that has a third small number that is less than the first small number is then discarded. In various exemplary embodiments, this third small number is at most about 10 pixels for a first small number of 15.

Similarly, the bounding boxes for all components comprising at least a first large number were added to the document features portion of the appended data. In various exemplary embodiments, this first large number is about 10,000 pixels. The connected component analyzing circuit, routine or manager 640 identifies all connected components having a second large number that is less than the first large number and determines the bounding boxes for those connected components. In various exemplary embodiments, this second large number is at least 5,000 pixels for a first large number of 10,000. The connected component analyzing circuit, routine or manager 640 then tries to match the second-large-number-pixel or more connected components with the bounding boxes provided by the document authentication system 100.

Then, once the connected component analyzing circuit, routine or manager 640 has matched both the large and small connected components to features provided in the appended data, the connected component analyzing circuit, routine or manager 640 attempts to match the remaining connected components generated by the connected component generating circuit, routine or manager 635 with the bounding boxes transmitted in the appended data. In particular, in various exemplary embodiments, the connected component analyzing circuit, routine or manager 640 considers, for each identified connected component, all of the transmitted bounding box which, if expanded by about 4 pixels in the extraction, and expanded by about 3 pixels in the y-direction, fully overlaps that connected component.

If there is no such bounding box in the appended data, the connected component analyzing circuit, routine or manager 640 does not assign that connected component to anything at this time. On the other hand, if the connected component analyzing circuit, routine or manager 640 identifies at least one such bounding box, then the current connected component is assigned to the bounding box which it overlaps the most, based on the initial sizes of the bounding boxes. It should be appreciated that the amount of overlap of the two bounding boxes is defined as a percentage of overlap relative to the larger of the two bounding boxes.

After some of the connected components have been assigned to the transmitted bounding boxes, the connected component analyzing circuit, routine or manager 640 can use this assignment information to further refine the positions of all the other connected components. For every transmitted bounding box, the connected component analyzing circuit, routine or manager 640 notices the difference between the transmitted position, i.e., the position identified in the appended data based on the transmitted bounding box, and the position of the associated connected component, as observed by the connected component generating circuit, routine or manager 635. It should be appreciated that this distortion is usually due to different scanners used between the document verification process and the document authentication process.

In various exemplary embodiments, for any unassigned connected components, the connected component analyzing circuit, routine or manager 640 moves that unassigned connected component by a weighted sum of the translations observed at the bounding boxes close to that unassigned connected component. More precisely:

$$w_d = e^{\left(\frac{d^2}{3000}\right)} \qquad (2)$$

where d is the distance between the centroids of the nearby connected components and the centers of the associated bounding boxes, and $w_d$ is the weighted bounding box translation vector.

The inventors have determined that, after this position-adjusting step, the x-coordinates and the y-coordinates of the same connected component in the scan for document authentication and the scan for document verification usually agree to within two pixels. As a result of the connected component generating circuit, routine or manager 635 and the connected component analyzing circuit, routine or manager 640, the connected components used during the document authentication process and the connected components used during the document verification process are generally the "same".

The connected components ordering circuit, routine or manager 645 inputs the revised set of connected components determined by the connected component analyzing circuit, routine or manager 640 and the assist channel data stored in the assist channel portion 622. The connected components ordering circuit, routine or manager 645 generates an ordered list of the revised set of the connected components based on the assist channel data. The assist channel data used by the connected components ordering circuit, routine or manager 645 includes information and/or hints on how to reconstruct the ordered list of the revised set of connected components. The connected components ordering circuit, routine or manager 645 outputs the ordered list of the revised set of connected components to the hash value generating circuit, routine or manager 650. In various exemplary embodiments, the connected component ordering circuit 645 orders the connected components in groups of connected components. In various exemplary embodiments, the assist channel data includes information and/or hints on how the connected components should be grouped.

Like the connected components ordering circuit routine or manager 145, the connected components ordering circuit, routine or manager 645 of the document verification system also orders the remaining connected components starting from a top-left-most connected component. In particular, in various exemplary embodiments, the ordering performed by the connected components ordering circuit, routine or manager 645 is identical to the ordering performed by the connected components ordering circuit, routine or manager 145, except that the connected components ordering circuit, routine or manager 645 uses a slightly more restrictive neighborhood definition and, if necessary, adds the transmitted connected components to the neighborhood. For example, to use a slightly more restrictive neighborhood definition, the connected components ordering circuit, routine or manager 645 requires 90% overlap rather than 85% overlap for the first and second criteria outlined above and requires 30% overlap rather than 20% overlap for the third criteria outlined above.

At this point, the document verification device 600 should have established a significant matching of its connected components with the connected components as used by the document authentication device 100 when generating the connected component order and shape hash values. Accordingly, the hash value generating circuit, routine or manager 650 performs exactly the same hashing steps as outlined above with respect to the hash value generating circuit, routine or manager 150 of the document authentication device 150.

The hash value generating circuit, routine or manager 650 inputs the ordered list of the revised set of connected components and hashing information and/or hints from the assist channel data stored in the assist channel portion 622 of the memory 620 and determines a first verifier hash value from the ordered list of the revised set of connected components based on the hashing information. The hash value generating circuit, routine or manager 650 outputs the first verifier hash value to the memory 620 under control of the controller 610. The hash value generating circuit, routine or manager 650 determines the first verifier hash value using the same known or later-developed hashing technique as the hash value generating circuit, routine or manager 150. In various exemplary embodiments, the hash value generating circuit, routine or manager 650 determines the first verifier hash value using a sequential hashing technique. In various exemplary embodiments, the hash value generating circuit, routine or manager 650 determines the first verifier hash value based on the rounded positions of the connected components. In various exemplary embodiments, the information/hints from the assist channel are rounding hints.

In various exemplary embodiments, after the hash value generating circuit, routine or manager 650 has generated the hash value based on the rounded positions of the connected components, the hash value generating circuit, routine or manager 150 then generates a cryptographically secure hash value based on the shapes of the various connected components. In various exemplary embodiments of this invention, a number of previously chosen functions, whose shapes are represented in FIG. 12, are convolved with each connected component. It should be appreciated that, in the systems and methods according to this invention, a connected component can be regarded as a density function in the image plane. It should also be appreciated that, when the image data is gray scale data, its function is not a simple binary function. In convolving the shape functions shown in FIG. 12 with each connected component, the two functions are aligned in a plurality of different possible ways by moving one of the two functions horizontally, vertically or rotationally, or using a combination of these movements. Then, the shape function is multiplied with the connected component on a pixel-by-pixel basis. Then, the sum is generated over all of these products.

For each of the different functions shown in FIG. 12, the alignment which gives a maximal value of this sum for a particular connected component is identified as the shape value $S_v$ for that connected component. In general, the hash value generating circuit, routine or manager 650 uses Eq. (1) to generate the shape values $S_v$ to be used to generate the second verifier hash value.

The value of the shape function $S_v$ is then divided by a predetermined number to yield a number in a predefined range. This number in the predefined range is then hashed. Of course, if the number in the predefined range is close to be a multiple of the predefined value, appropriate rounding hints used from the assist channel data in the assist channel portion 622. In various exemplary embodiments, this predetermined value is 64, yielding a range of 0-3 for the number. The hashing function performed by the hashing value generating circuit, routine or manager 650 with respect to the shape function is described in further detail below with respect to FIG. 12.

The hash value comparing circuit, routine or manager 655 inputs the first and second verifier hash values and corresponding first and second authentication hash values from the document feature portion 623. The hash value comparing circuit, routine or manager 655 compares the first and second verifier hash value to the corresponding ones of the first and second authentication hash values. If the respective hash values are about equivalent, then the hash value comparing circuit, routine or manager 655 outputs a signal or an indication via the input/output interface 605 to the display device 900 over the link 905 and/or to the printer 1000 over the link 1005 that the document is unchanged from the signed document image data. If the respective hash values are not about equivalent, then the hash value comparing circuit, routine or manager 655 outputs, under control of the controller 610, a signal or indication via the input/output interface 605 to the display device 900 over the link 905 and/or to the printer 1000 over the link 1005 that the document has been altered since the authentication hash values were generated.

Figure 3:
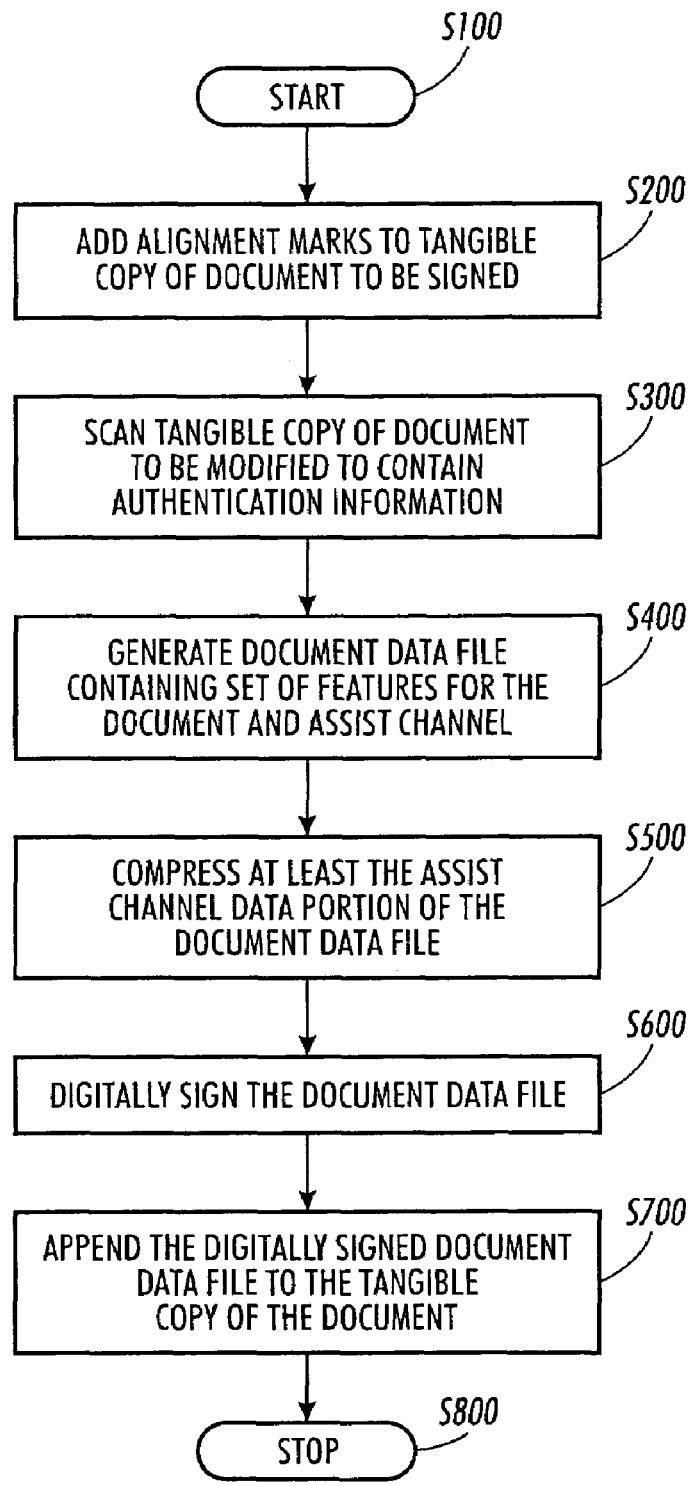
FIG. 3 is a flowchart outlining one exemplary embodiment of a method for authenticating a document according to this invention.

FIG. 3 is a flowchart outlining one exemplary embodiment of a method for authenticating a document according to this invention. As shown in FIG. 3, operation of the method begins in step S100, and continues to step S200, where alignment marks are added to a tangible copy of a document to be signed or authenticated. Then, in step S300, the tangible copy of the document to be signed by modifying the tangible copy to contain authentication information is scanned. Next, in step S400, a document data file containing one or more sets of features for the document and an assist channel is generated. Operation then continues to step S500.

In step S500, at least the assist channel data portion of the document data file generated in step S400 is compressed. However, it should be appreciated that, in various other exemplary embodiments, additional portions of, or even the entire, document data file can be compressed if appropriate. Next, in step S600, the document data file is digitally signed. Then, in step S700, the digitally signed document data file is appended to the tangible copy of the document to sign and/or authenticate the tangible copy of the document. Operation then continues to step S800, where operation on the method ends.

It should be appreciated that, in the flowchart outlined in FIG. 3, step S200 can be omitted. That is, if the tangible copy of the document to be signed and/or authenticated already contains alignment marks, if the alignment is based on selected image features rather than alignment marks, or if alignment is not used, it is not necessary to perform step S200 to add such alignment marks. In this case, operation can continue directly from step S100 to step S300.

Figure 4:
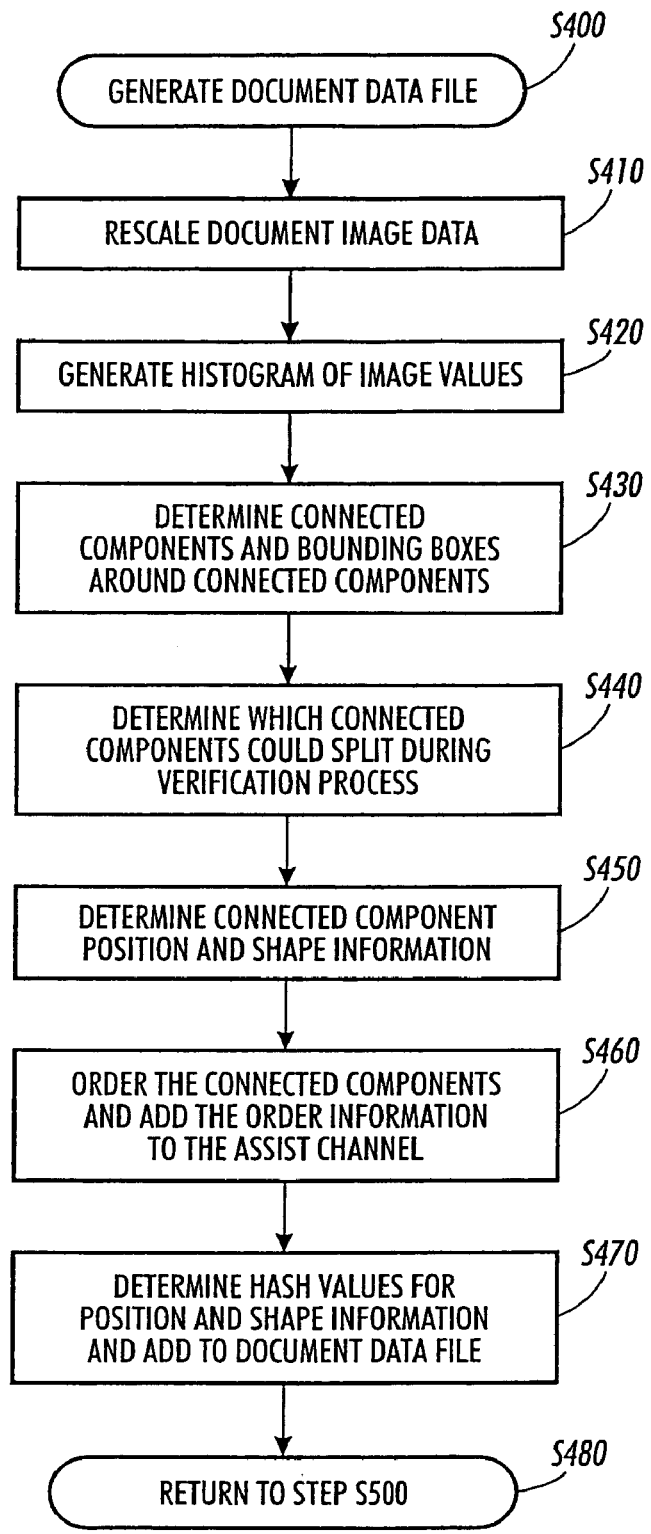
FIG. 4 is a flowchart outlining in greater detail one exemplary embodiment of the method for generating a document data file containing an assist channel and a set of features for a document according to this invention.

FIG. 4 is a flowchart outlining in greater detail one exemplary embodiment of the method for generating a document data file of step S400. As shown in FIG. 4, operation of the method begins in step S400, and continues to step S410, where the document image data is rescaled based on the alignment marks or on selected image features so that the document image data obtained from scanning the tangible copy is a standard size. This assures that when the information generated in step S400 is compared to corresponding information generated during document verification, differences in scanning do not interfere in the verification process. Then, in step S420, a histogram of the image values is generated. Next, in step S430, the connected components and the bounding boxes around the connected components are determined. Operation then continues to step S440.

In step S440, the connected components that could split during the verification process are determined. Next, in step S450, the connected component position and shape information is determined based on the centroids of the bounding boxes and a set of shape functions to which the shapes of the connected components are compared. Then, rounding information for ensuring that the positions of the connected components will be correctly rounded during the verification process is added to the assist channel. Similarly, rounding information usable to ensure that the connected component shape values are correctly rounded prior to determining the hash value for the connected component shape values is added to the assist channel. Operation then continues to step S460.

In step S460 the connected components are ordered based on the relative spatial positions and any degree of overlap between the connected components. The order information obtained when ordering the connected components is added to the assist channel. Then, in step S470, hash values for the position information for the shape information are determined and are added to the document data file. Operation then continues to step S480, where operation returns to step S500.

It should be appreciated that, if aligning the image data is not necessary or desired, step S410 can be omitted. In this case, operation jumps from step S400 directly to step S420.

Figure 5:
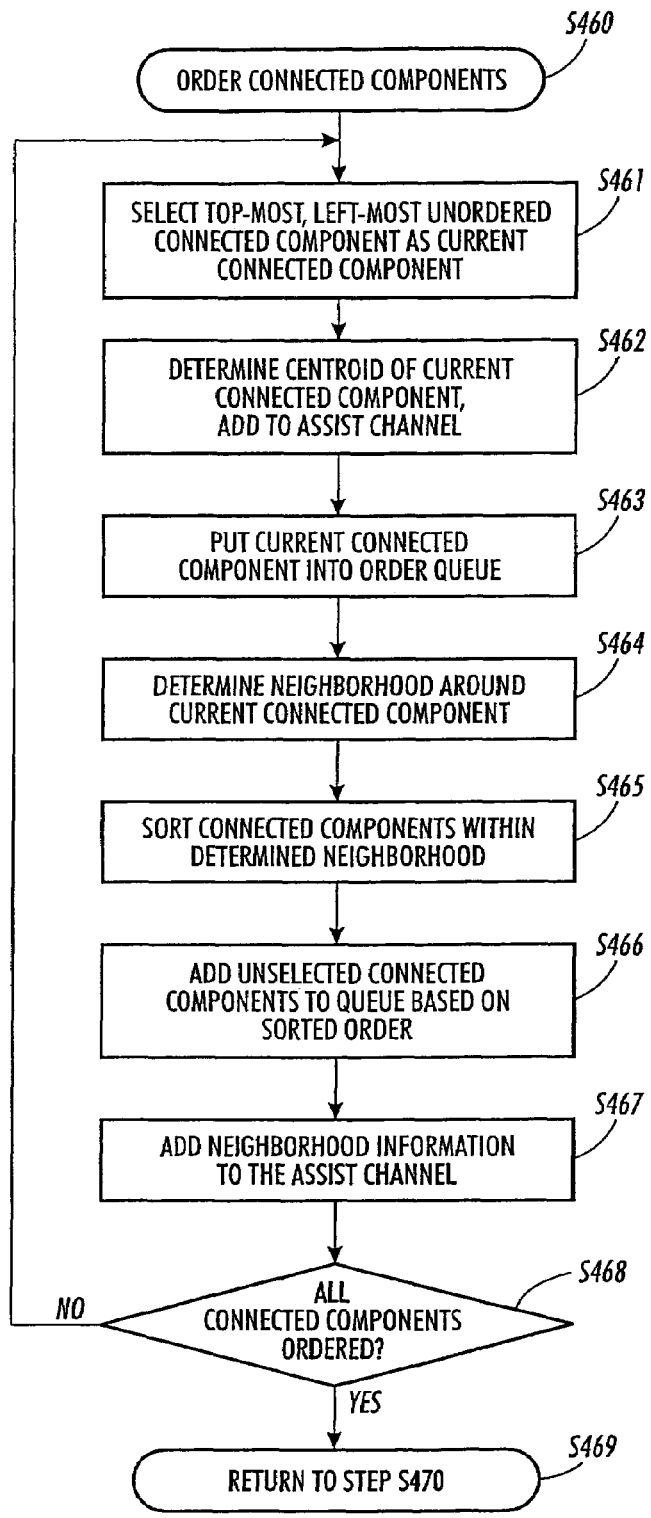
FIG. 5 is a flowchart outlining in greater detail one exemplary embodiment of the method for ordering the connected components and adding the ordering information to the appended information according to this invention.

FIG. 5 is a flowchart outlining in greater detail one exemplary embodiments of the method for ordering the connected components of step S460 of FIG. 4. As shown in FIG. 5, beginning in step S460, operation continues to step S461, where a top-most, left-most unordered connected component is selected as the current connected component. Then, in step S462, the centroid of the current connected component is determined, and added to the assist channel. Next, in step S463, the current connected component is put into an order queue. In various exemplary embodiments, the order queue is a first-in, first-out queue. Accordingly, in this case, the current connected component is put into the order queue at the bottom of the order queue. Operation then continues to step S464.

In step S464 the connected components that lie within the neighborhood around the current connected component are determined. In general, only those connected components that have not already been ordered and thus have been or are present in the first in-first out order queue are determined to lie within the neighborhood around the connected component. Next, in step S465, the unordered connected components determined to lie within the neighborhood around the current connected component are themselves sorted. Then, in step S466, the unselected connected components that lie within the neighborhood around the current connected component are placed in the first in-first out of order queue based on their sorted order. Operation then continues to step S467.

In step S467, the neighborhood information generated in steps S464-S466 is added to the assist channel. Then, in step S468, the determination is made whether all of the connected components in the scanned image data have been ordered. If not, operation jumps back to step S461. In contrast, if all of the connected components in the scanned image have been order, operation continues to step , S469 which returns control to the step S470. When returning to step S461, again the top-most left-most of the unordered connected components that have not yet been placed into the order queue is selected as the current connected component.

Figure 6:
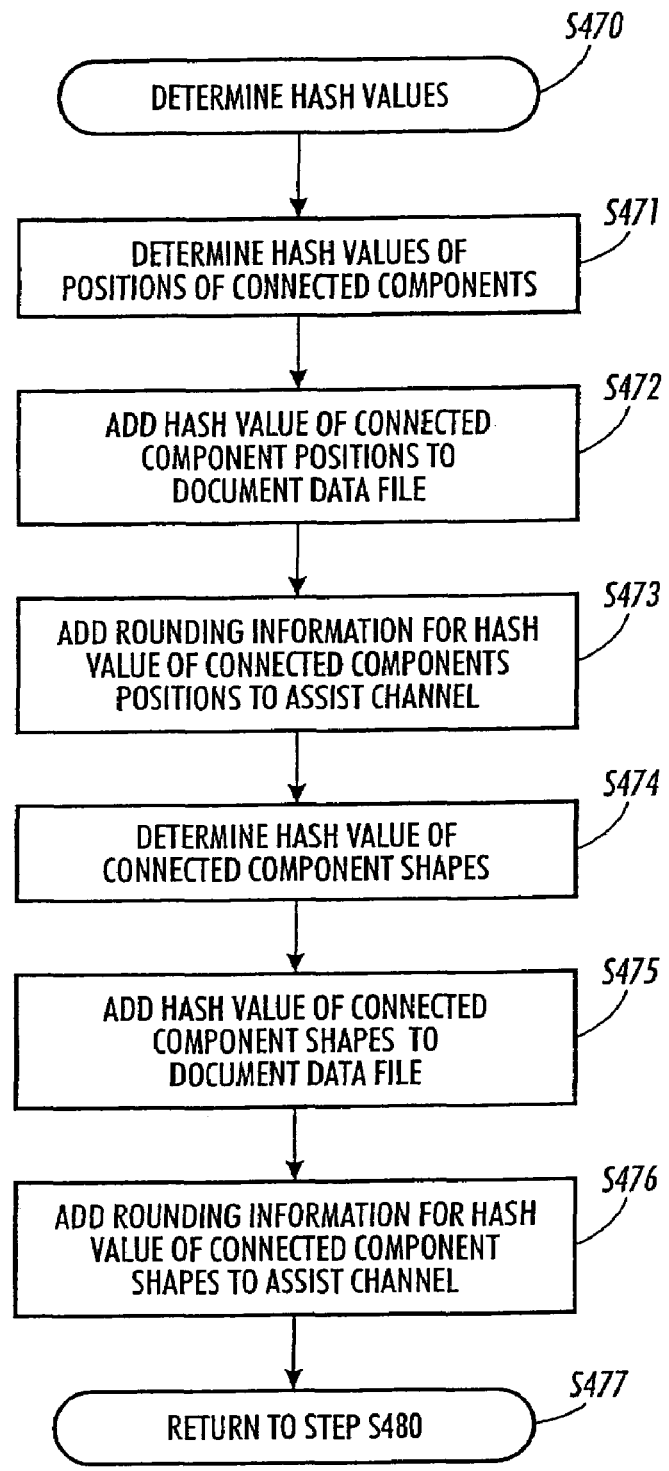
FIG. 6 is a flowchart outlining in greater detail one exemplary embodiment of the method for determining hash values and adding the hash values and information to the appended information according to this invention

FIG. 6 is a flowchart outlining in greater detail one exemplary embodiment of the method for determining the hash values of step S470. As shown in FIG. 6, beginning in step S470, operation continues to step S471, where the hash value of the positions of the connected components is determined. Then, in step S472, the hash value of the positions of the connected components is added to the document data file. Operation then continues to step S473, where the hash values for the positions at the connected components are rounded and this information is added to the assist channel. Operation then continues to step S474.

In step S474, the hash values for the connected component shapes are determined. Next, in step S475, the hash values of the determined connected component shapes are added to the document data file. Operation then continues to step S476, where the hash values of the connected component shapes are rounded and this information is added to the assist channel. Then operation returns to step S490.

Figure 7:
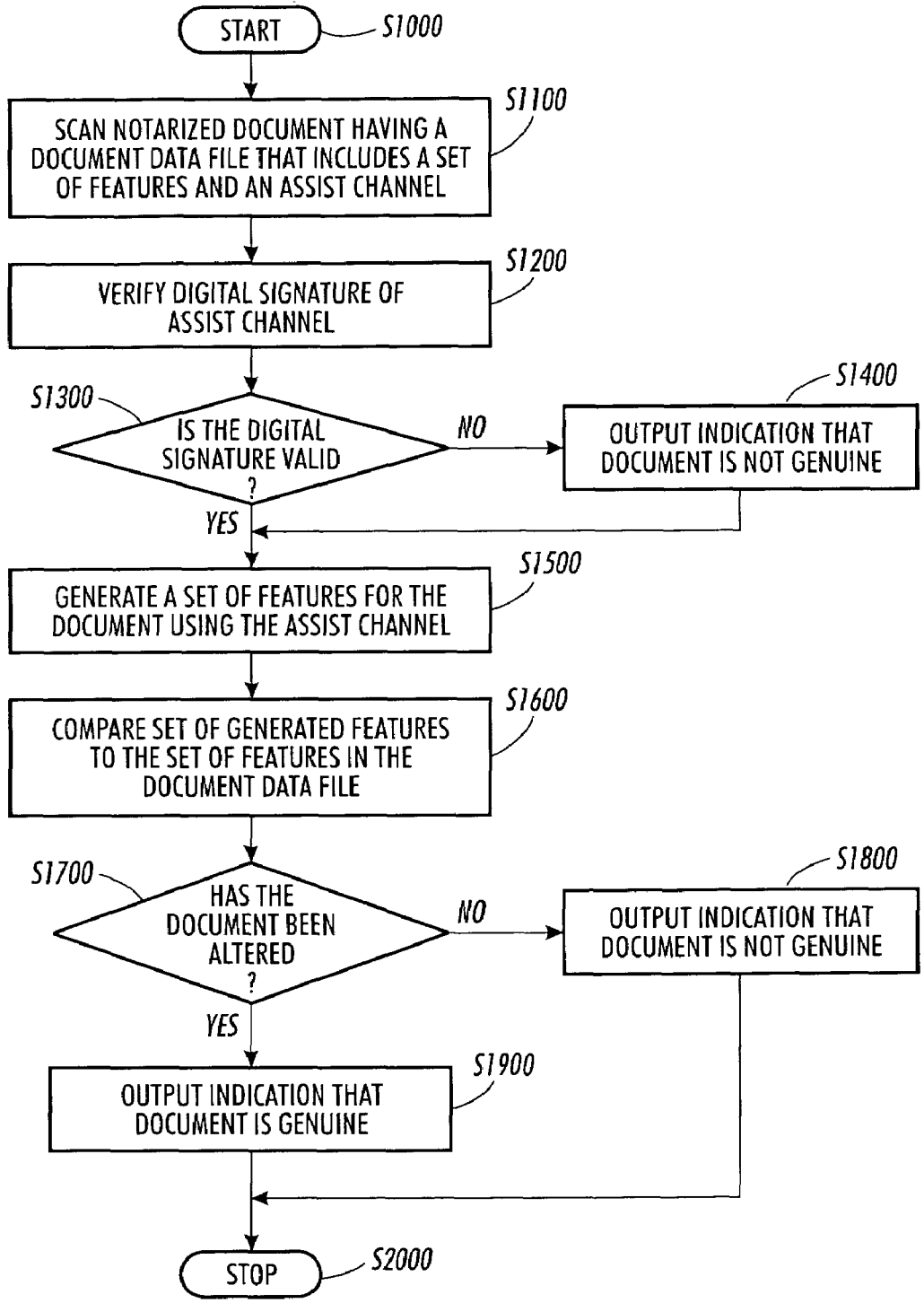
FIG. 7 is a flowchart outlining one exemplary embodiment of a method for verifying a document according to this invention.

FIG. 7 is a flowchart outlining one exemplary embodiment of a method for verifying a document according to this invention. As shown in FIG. 7, operation of the method begins in step S1000, and continues to step S1100, where a notarized, or signed or authenticated, document to which a document data file having a set of features and assist channel has been appended, is scanned. Then, in step S1200, the digital signature used to digitally signed at least the assist channel is analyzed to determine if it is a valid signature. Next, in step S1300, a determination is made whether the digital signature is valid. If the digital signature is not a valid signature, operation continues to step S1400. Otherwise, operation jumps to step S1500.

In step S1400, an indication is output that the digital signature used to sign the assist channel is not the correct digital signature for the person purported to have signed the assist channel. Operation then continues to step S1500. However, in various other exemplary embodiments, operation can jump directly from step S1400 to either step S1800 or step S2000. In these alternative exemplary embodiments, the operation of steps S1500-S1700, or S1500-S1900, respectively, is omitted, as the document is assumed to have been altered in view of the invalidity of the digital signature.

In step S1500, a set of features for the document is generated using the information contained in the assist channel. Next, in step S1600, the set of features generated in step S1500 is compared to the set of features contained in the document data file that was appended to the notarized, authenticated or digitally signed document. Then, in step S1700, based on the comparison, a determination is made whether the document has been altered since it was authenticated. If so, operation continues to step S1800. Otherwise, operation jumps to step S1900.

In step S1800, an indication is output that the document cannot be authenticated, and thus is probably not genuine. Operation then jumps to step S2000. In contrast, in step S1900, an indication is output that the document can be authenticated and thus is probably genuine. Operation then continues to step S2000, where operation of the method ends.

Figure 8:
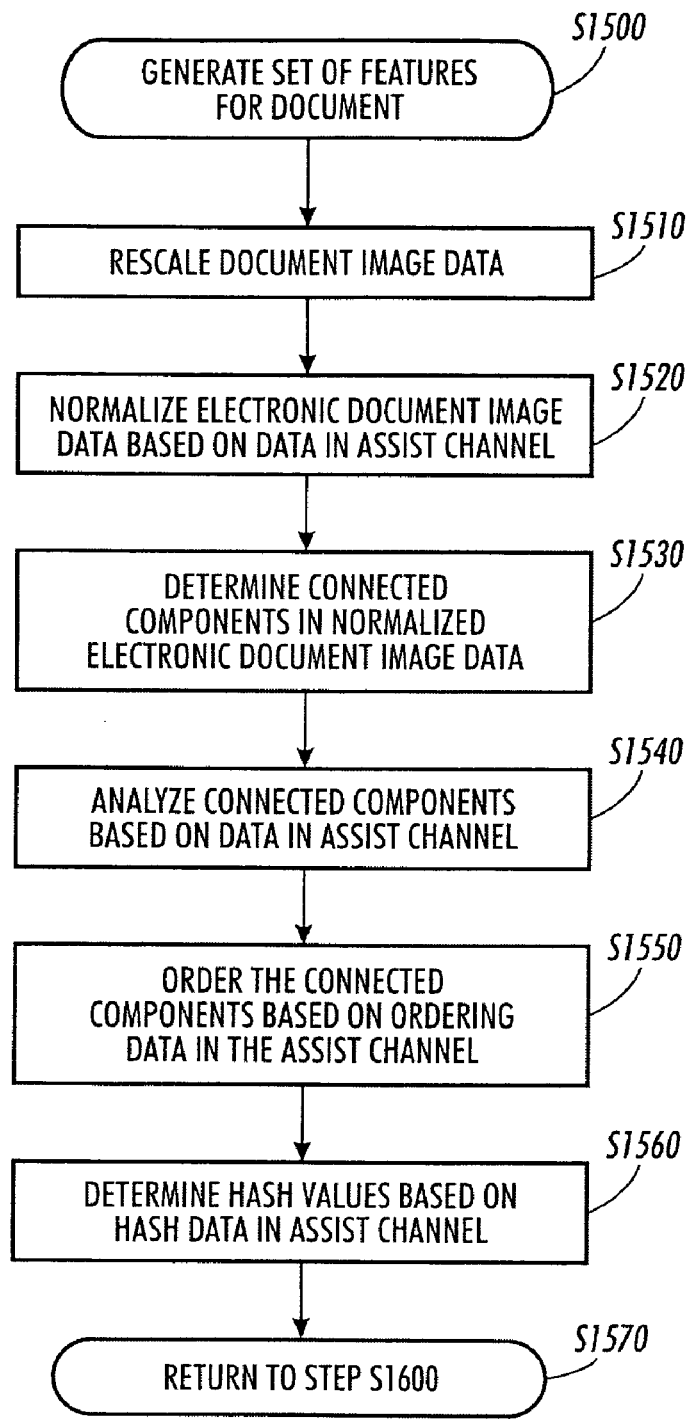
FIG. 8 is a flowchart outlining in greater detail one exemplary embodiment of the method generating a set of features for the document using the appended information according to this invention

FIG. 8 is a flowchart outlining in greater detail one exemplary embodiment of a method of generating the set of features for the document of step S1500. As shown in FIG. 8, beginning in step S1500, operation continues to step S1510, where, if desired or necessary, the document image data is rescaled based on alignment marks provided on the tangible copy of the document to be verified or selected image features of the document to be verified. As outlined above with respect to step S410, if desired or necessary, the document image data is rescaled so that the document image data is a standard size so that the data derived from the image data is can be accurately compared to the information provided in the document data file. Then, in step S1520, the electronic document image data is normalized based on histogram information contained in the assist channel. Next, in step S1530, the connected components in the normalized electronic image data are determined. Operation then continues to step S1540.

In step S1540, the determined connected components are analyzed based on the data contained in the assist channel. Next, in step S1550, the connected components are ordered based on ordering data is contained in the assist channel. Then, in step S1560, hash values are determined based on the determined, analyzed and ordered connected components. Operation then continues to step S1570, where control returns to step S1600.

Of course, as outlined above with respect to step S410, if aligning the image is not necessary or desired, step S1510 can be omitted. In this case, operation jumps directly from step S1500 to S1520.

Figure 9:
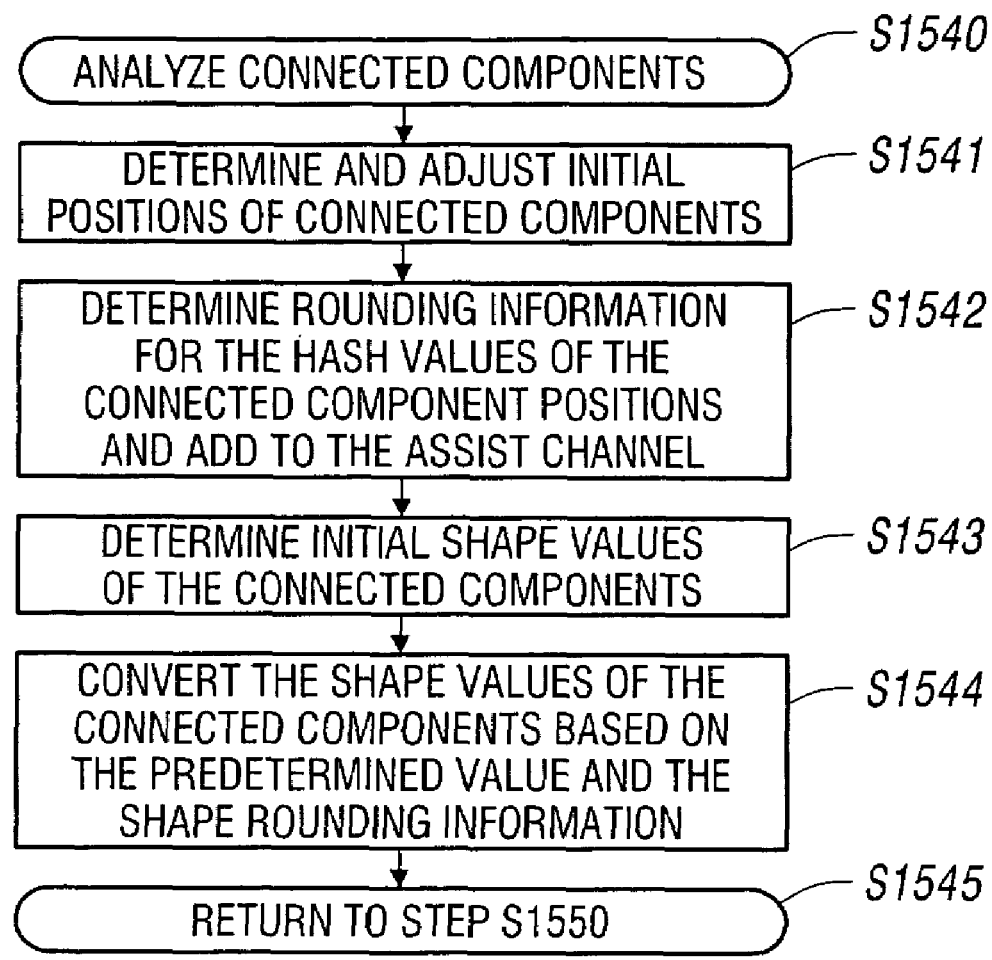
FIG. 9 is a flowchart outlining in greater detail one exemplary embodiment of the method for analyzing connected components based on data contained in the appended information according to this invention.

FIG. 9 is a flowchart outlining in greater detail one exemplary embodiment of the method for analyzing the connected components of step S1540. As shown in FIG. 9, operation of the method begins in step S1540, and continues to step S1541, where the initial positions of the connected components are determined and adjusted as outlined above with respect to Eq. (2). Then, in step S1542, the position values of the connected components are converted based on the periodic discrete value and the position rounding information contained in the assist channel. Next, in step S1543, the initial shape values of the connected components are determined. Then, in step S1544, the shape values of the connected components are converted based on the predetermined value and the shape rounding information contained in the assist channel. Operation then continues to step S1545, where operation returns to step S1550.

Figure 10:
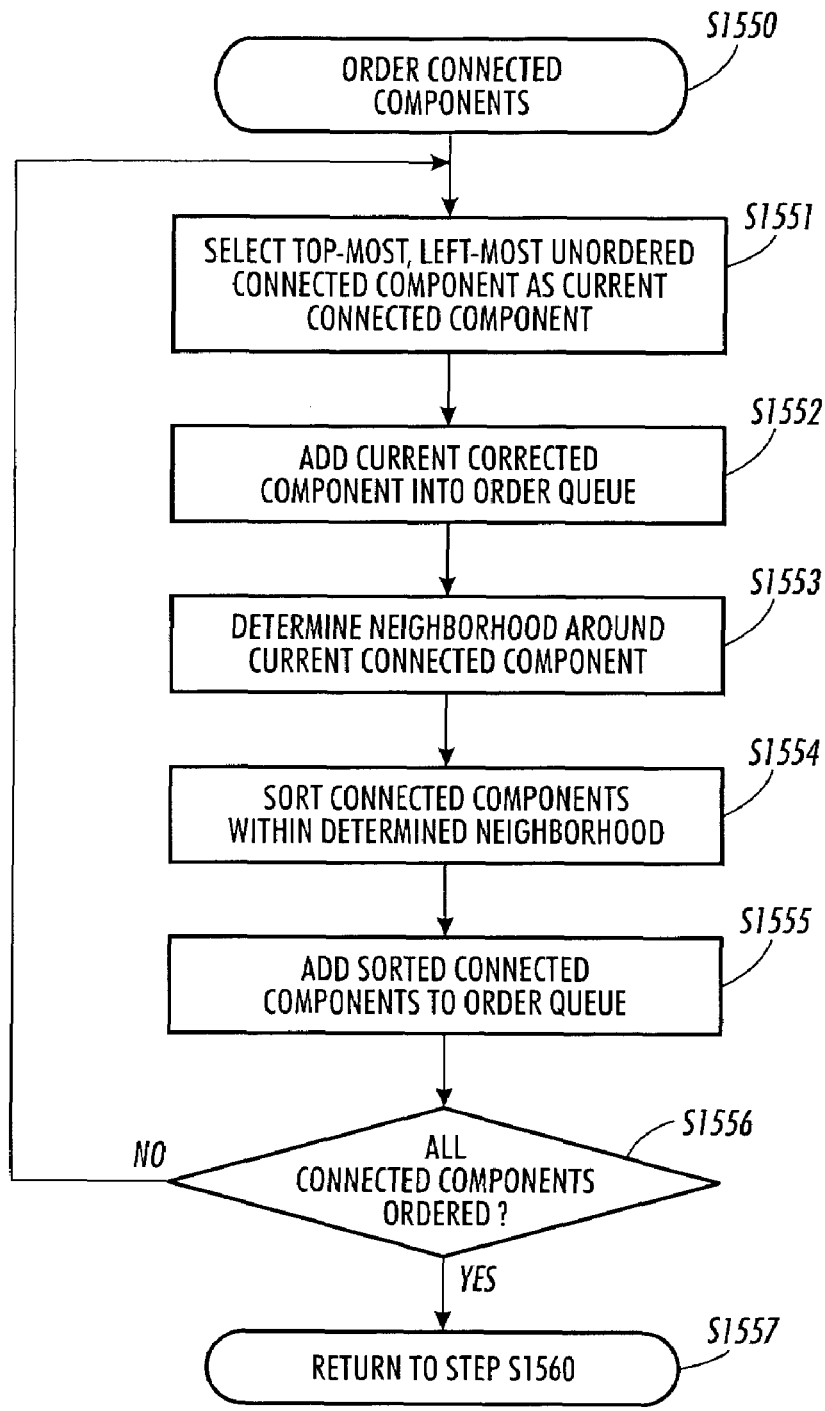
FIG. 10 is a flowchart outlining in greater detail one exemplary embodiment of the method for analyzing the connected components based on the data in the appended information according to this invention.

FIG. 10 is a flowchart outlining in greater detail one exemplary embodiment of the method for ordering the connected components of step S1550. As shown in FIG. 10, beginning in step S1550, operation continues to step S1551, where a top-most, left-most unordered connected component is selected as the current connected component. Then, in step S1552, the current connected component is added into an order queue. Next, in step S1553, the connected components that lie within a neighborhood around the current connected component are determined. It should be appreciated that, in various exemplary embodiments, the connected components that are determined to lie within the neighborhood around the current connected component in step are limited to those connected components that have not yet been ordered by placing them into the order queue. Operation then continues to step S1554.

In step S1554, the determined connected components that lie within the neighborhood around the current connected component are sorted. Next, in step S1555, the sorted determined connected components that lie within the neighborhood around the current connected component are added to the order queue. Then, in step S1556, a determination is made whether all of the connected components determined in step S1530 and analyzed in step S1540 have been ordered. If not, operation jumps back to step S1551. Otherwise, operation continues to step S1557, where operation returns to step S1560.

FIG. 11 is a flowchart outlining one exemplary embodiment of a method for determining hash values of step S1560. Beginning in step S1560, operation continues to step S1561 where the hash value of the positions of the connected components is determined based on the rounding information in the assist channel. Then, in step S1562, the hash value at the shapes of the connected components is determined based on the rounding information in the assist channel. Then, at step S1563, operation returns to step S1570.

FIG. 12 shows one exemplary embodiment of the neighborhood functions that can be used by the document authentication process and the document verification process, respectively. As shown in FIG. 12, in both the document authentication process, and the document verification process, the pixel of interest around which the neighborhood analysis will be performed is indicated as the X pixel. As outlined above, it should be appreciated that the pixel of interest X can either be an initially selected pixel or it can be a pixel added to a connected component in a previous iteration of the neighborhood analysis performed by either the document authentication process of the document verification process.

As shown in FIG. 12. during the document authentication process, a more expansive or liberal neighborhood around the pixel of interest X is used. This more expansive or liberal neighborhood is indicated by the pixels labeled as both V and S. In contrast, the document verification process uses the more restrictive or conservative neighborhood indicated by the pixels labeled V. It should be appreciated that, as shown in FIG. 12, using these two different definitions for the neighborhood around the pixel of interest X, any pixel that will meet the criteria for being added to the current connected component during the verification process must also meet the criteria for inclusion in a corresponding current connected component during the document authentication process. In contrast, the contrary situation is not true. That is, a pixel identified during the document authentication process for inclusion in the current connected component will not necessarily be identified for inclusion in the corresponding current connected component generated by the document verification process.

The following are experimental results regarding convolutions of shape functions on a page containing 26 letters of the alphabet in both lower and upper case, as well as 10 digits. Twelve convolution functions sufficed to separate all character. The shape functions are modeled as set forth in FIG. 13. Given the base shape described below, for every point (x, y) in the plane, its distance to the shape is computed, and the value of the function is $$e^{\frac{-d^2}{50}}.$$

In this experiment, these 12 convolutions were used. In addition, half-sized versions of these functions convolved with just the upper half of every connected component, yielding another 12 values. With these 24 values all upper and lower case letters were distinguishable, as well as the 10 digits.

Figure 14:
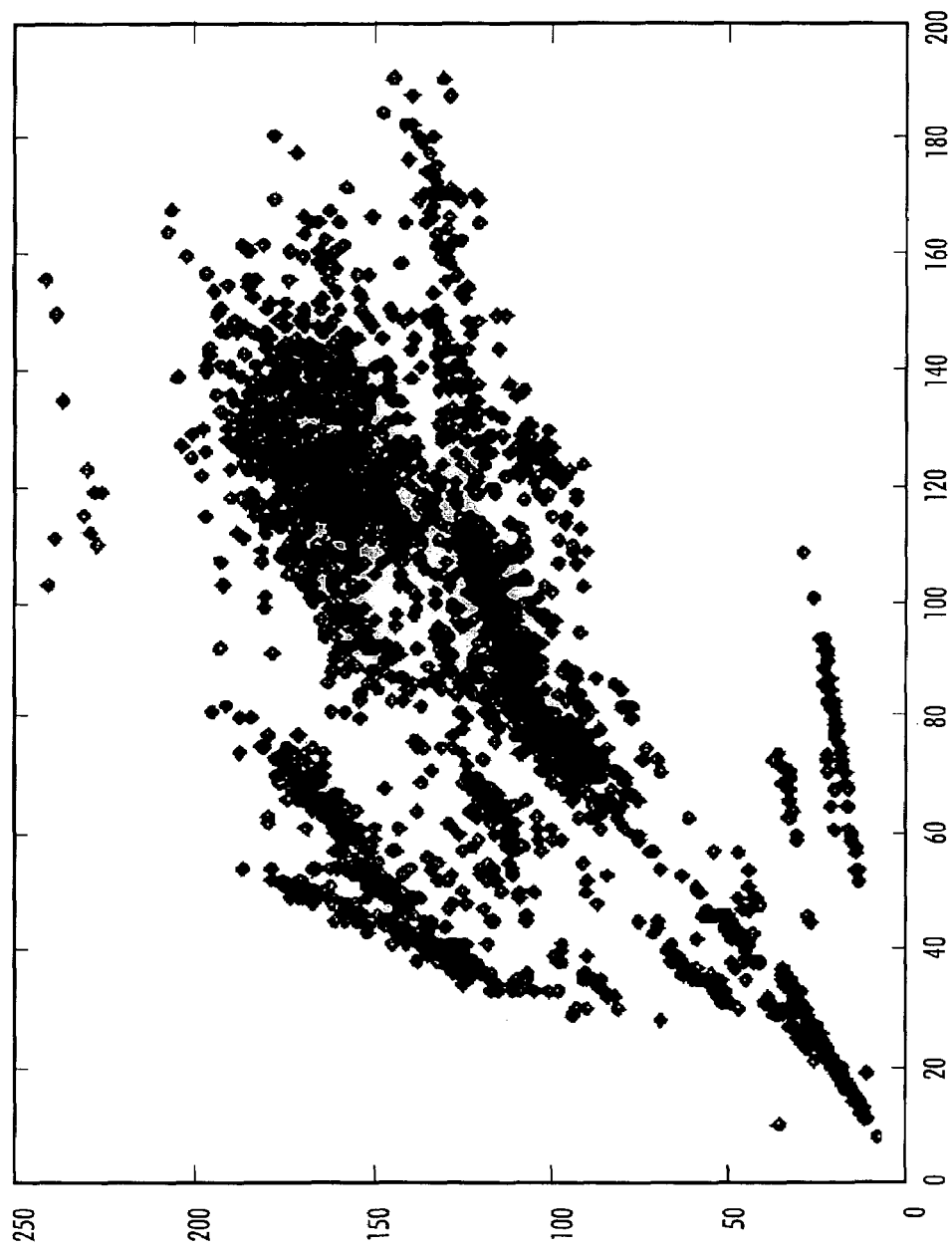
FIG. 14 is a plot of the least correlation among the exemplary convolution functions of FIG. 13.
Figure 15:
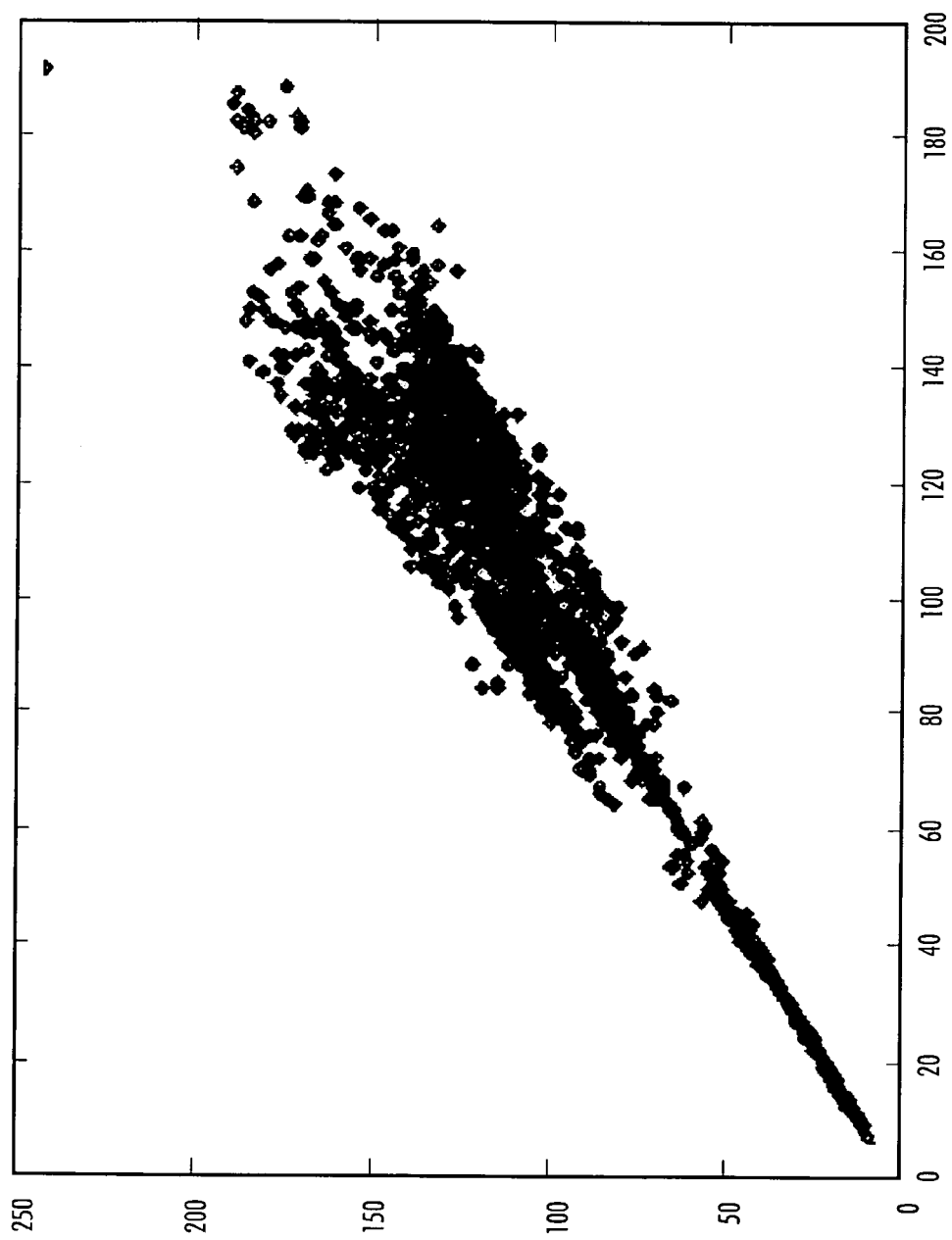
FIG. 15 is a plot of the most correlation among the exemplary convolution functions of FIG. 13.

These functions are somewhat correlated. The smallest correlation is between the third and fourth functions (horizontal and vertical bar, respectively), as shown in the plot displayed in FIG. 14, where the x-axis corresponds to the response to the horizontal bar and the y-axis represents the response to the vertical bar. The most correlated are the 7$^{th}$ and 8$^{th}$ shapes, shown in the plot displayed in FIG. 15.

It should be understood that there are many ways in which the "shape signing" can be altered. For example, the choice of the convolution functions may be changed. Ideally, convolution functions are chosen individually for each document from a large set of possible functions. There are two possibilities for the selection of such a large set.

First, a large set of geometrical shapes as shown in FIG. 13 should be determined. Then, the characteristics of connected components likely to appear in scanned documents are studies to derive a effective set of convolution functions. Each shape should appear in different sizes to account for different font sizes.

Second, sets of convolution functions can be chosen based on the image. For example, this method is based on connected components that are considered to be "minimal" in some sense, i.e., no other connected component appears as a subset of that connected component. Alternatively, connected components can be split into pieces to yield the function set. The following are examples: sweep a horizontal (or vertical line) over the connected component, and cut the connected component every time the number of intersections with the component changes; break the connected component at the positions where it touches its bounding box; break the connected component at positions where the connected component is especially "thin"; or take pairs of components and find the position where they overlap the most, and then take the symmetric difference which will yield the pieces. For the example using positions where the connected component is especially thin, a connected component will be thin when, after one or a very few pixels are removed at a particular position, the connected component would split into two or more portions at that position.

After breaking the connected components, the pieces can form a set from which the actual convolution functions are selected. The convolution functions are smoothed to decrease possible rounding errors.

It should be understood that, ideally, the convolution functions should be chosen such that they distinguish as many characters as possible. If the convolution of every function and every component is determined, then the resulting maximal values can be considered as a matrix, where the rows correspond to shape functions and the columns correspond to the connected components in the image. It should be understood that the problem then is to pick a small set of rows, for example, 10 rows, such that the number of different columns in the sub-matrix spanned by these rows is maximized. Alternatively, the maximal number of columns that are the same can be minimized. However, this problem is NP-complete. Because it is difficult to find an optimal solution, it should be understood that random approaches may be employed. For example, 10 rows in succession may be chosen, where every row is picked according to a probability distribution. This distribution will reflect how "good" a particular row is, i.e., how many different columns it produces. Alternatively, it should be understood that genetic algorithms may be employed to solve the problem.

While this invention has been described in conjunction with the specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of this invention.

What is claimed is:

1. A method for verifying a document containing an image, comprising:
   inputting electronic image data representative of the image on the document;
   generating verification document data from the electronic image data based on document data appended to the document, the verification document data comprising document feature data and the appended document data comprising document feature data and verification assist data;
   comparing at least some of the generated document feature data with corresponding portions of the appended document feature data; and
   verifying the document based on results of comparing the at least some of the generated document feature data with corresponding portions of the appended document feature data.

2. The method of claim 1, wherein generating verification document data from the electronic image data comprises generating document feature data based on connected components present in the electronic image data.

3. The method of claim 2, wherein the generated document feature data includes connected component features and position information about the connected components.

4. The method of claim 1, wherein generating verification document data from the electronic image data comprises:
   determining connected components in the electronic image data; and determining position information about at least some of the connected components based on the verification assist data.

5. The method of claim 4, wherein:

determining connected components in the electronic image data comprises:

selecting a first pixel in the electronic image data having an image value within a first value of a fully black pixel, adding the first pixel to a first current connected component, identifying any pixel in the electronic image data that is within a first neighborhood of any pixel of the current connected components and that has an image value that is within a second value of a fully black pixel, adding the identified pixels to the first current connected component, and repeating the identifying and second adding steps until no pixels are added to the first current connected component during the second adding step;

the second value is closer to a fully black pixel than a corresponding value used to determine connected components determined during an authentication process used to generate the appended document data; and the first neighborhood is smaller than a corresponding neighborhood used to determine connected components determined during an authentication process used to generate the appended document data.

6. The method of claim 1, wherein:

the appended document data includes information about connected components determined during an authentication process used to generate the appended document data; and generating document data from the electronic image data comprises:

determining connected components in the electronic image data, and identifying some of the determined connected components based on at least some of the information about connected components contained in the appended document data.

7. The method of claim 6, wherein the information about connected components contained in the appended document data comprises position information about at least some connected components determined during the authentication process that have a size that is at most about a first value; and identifying some of the determined connected components based on at least some of the information about connected components contained in the appended document data comprises:

identifying small connected components of the determined connected components having a size that is at most about a second value that is greater that the first value, matching the identified small connected components to the position information about at least some connected components determined during the authentication process that have a size that is at most about the first value, and deleting from the determined connected components any identified small connected component that was not matched to one of the connected components determined during the authentication process that has a size that is at most about the first value and that is at most a third value that is less than the first value.

8. The method of claim 7, wherein the first value is about 15 pixels, the second value is about 20 pixels and the third value is about 10 pixels.

9. The method of claim 7, wherein matching the identified small connected components to the position information about at least some connected components determined during the authentication process that have a size that is at most about the first value comprises matching the identified small connected components to centroid locations of the connected components determined during the authentication process that have a size that is at most about the first value.

10. The method of claim 6, wherein the information about connected components contained in the appended document data comprises position information about at least some connected components determined during the authentication process that have a size that is at least about a first value; and identifying some of the determined connected components based on at least some of the information about connected components contained in the appended document data comprises:

identifying large connected components of the determined connected components having a size that is at least about a second value that is less that the first value, matching the identified large connected components to the position information about at least some connected components determined during the authentication process that have a size that is at least about the first value, and deleting from the determined connected components any identified large connected component that was not matched to one of the connected components determined during the authentication process that has a size that is at least about the first value.

11. The method of claim 10, wherein the first value is about 10000 pixels and the second value is about 5000 pixels.

12. The method of claim 10, wherein matching the identified small connected components to the position information about at least some connected components determined during the authentication process that have a size that is at least about the first value comprises matching the identified small connected components to bounding boxes of the connected components determined during the authentication process that have a size that is at least about the first value.

13. The method of claim 1, wherein:

the appended document data comprises position information about at least some connected components determined during the authentication process to likely correspond to at least two connected components determined during a verification process; and generating document data from the electronic image data comprises:

determining connected components in the electronic image data; and determining, from the determined connected components, which connected components correspond to connected components determined during the authentication process to likely correspond to at least two connected components determined during a verification process based on the position information about at least some connected components determined during the authentication process to likely correspond to at least two connected components determined during a verification process contained in the appended data.

14. The method of claim 13, wherein:
the position information about at least some connected components determined during the authentication process to likely correspond to at least two connected components determined during a verification process comprises a bounding box around each of at least some of the connected components determined during the authentication process to likely correspond to at least two connected components determined during a verification process and bounding boxes for connected components determined during a verification process that lie entirely within a region formed around any of the bounding boxes included in the position information about at least some connected components determined during the authentication process to likely correspond to at least two connected components determined during a verification process; and
determining, from the determined connected components, which connected components correspond to connected components determined during the authentication process to likely correspond to at least two connected components determined during a verification process comprises:
  determining, for each determined connected component, whether that connected component lies entirely within a region around one of the bounding boxes contained within the position information about at least some connected components determined during the authentication process to likely correspond to at least two connected components determined during a verification process, and
  marking each such determined connected component that lies entirely within one of the bounding boxes.

15. The method of claim 14, wherein generating document data from the electronic image data further comprises:
  determining, for each marked determined connected component a difference between a position for that marked determined connected component and a position for a bounding box that that marked determined connected component corresponds to;
  determining, for each unmarked determined connected component, a weighted sum of the determined differences for marked determined connected components that are close to that unmarked determined connected component; and
  altering, for each unmarked determined connected component, a position of that unmarked determined connected component based on the weighted sum.

16. The method of claim 1, wherein generating document data from the electronic image data comprises:
  determining connected components in the electronic image data; and
  determining an order of the connected components based on at least a portion of the document data appended to the document.

17. The method of claim 16, wherein:
the appended document data comprises information about connected components used during an authentication process as initial members of groups of connected components used in ordering the determined connected components during the authentication process; and
determining an order of the connected components comprises:
  selecting a connected component based on information about one of the initial members used during the authentication process contained in the appended document data and that has not already been added to an ordered list of the connected components,
  adding the selected connected component to the ordered list of the connected components,
  identifying any connected components that are within a first neighborhood around the selected connected component and that have not already been added to the ordered list of the connected components, where the first neighborhood is more restrictive than a second neighborhood used during the authentication process;
  sorting the identified connected components,
  adding the sorted identified connected components to the ordered list of the connected components based on the sorting, and
  repeating the selecting, adding, identifying, sorting and adding steps until all of the determined connected components have been added to the ordered list.

18. The method of claim 17, wherein:
the appended document data further comprises information about border connected components that are on the borders of one of the second neighborhoods determined during the authentication process; and
identifying any connected components that are within a first neighborhood around the selected connected component and that have not already been added to the ordered list of the connected components comprises adding to the first neighborhood around the selected connected component comprises adding, based on the initial member that the selected connected component corresponds to and the border connected components that are on the border of the second neighborhood corresponding to that initial member, connected components of the determined connected components corresponding to those border connected components to the first neighborhood corresponding to the selected connected component.

19. The method of claim 17, wherein the information about the initial members used during the authentication process comprises centroids of the initial members.

20. The method of claim 1, wherein generating document data from the electronic image data comprises:
  determining a set of connected components in the electronic image data that matches a set of connected components determined during an authentication process;
  determining position information about the determined set of connected components based on at least a portion of the verification assist data; and
  generating a representative value based on the determined position information about the set of connected components.

21. The method of claim 20, wherein generating the representative value comprises generating a hash value from at least some of the set of connected components using a position-dependent hash function.

22. The method of claim 20, wherein generating the representative value comprises generating a hash value of the positions of at least some of the set of connected components.

23. The method of claim 1, wherein generating document data from the electronic image data comprises:
  determining a set of connected components in the electronic image data that matches a set of connected components determined during an authentication process;

determining shape information about the determined set of connected components; and generating a representative value based on the determined shape information about the set of connected components.

24. The method of claim 23, wherein generating the representative value comprises generating a hash value from at least some of the set of connected components using a shape-dependent hash function.

25. The method of claim 23, wherein generating the representative value comprises generating a hash value of the shapes of at least some of the set of connected components.

26. The method of claim 1, wherein generating the verification document data from the electronic image data based on document data appended to the document comprises modifying the electronic image data based on gray level information contained in the appended document data.

27. The method of claim 26, wherein modifying the electronic image data based on the gray level information comprises modifying the electronic image data based on a gray level histogram contained in the appended document data.

28. The method of claim 26, wherein the image on the document contains alignment marks, the method further comprising:
modifying the electronic image data based on the alignment marks; and
modifying the electronic image data based on the gray level information comprises modifying the electronic image data based on the gray level information after modifying the electronic image data based on the alignment marks.

29. A document verification system that generates verification data for a document containing an image and that determines whether the document is authentic based on the generated verification data and authentication data appended to the document, comprising:
means for inputting electronic image data representative of the image on the document;
a connected component generating circuit, routine or manager that generates connected components from the input electronic image data based on at least a portion of the authentication data;
a representative value generating circuit, routine or manager that generates at least one representative value based on the generated connected components; and
a comparing circuit, routine or manager that compares the at least one generated representative value to at least one corresponding representative value contained in the authentication data and that determines if the document is authentic based on the comparison.

30. The document verification system of claim 29, wherein a first portion of the authentication data includes position information about at least some connected components determined during the authentication process to likely correspond to at least two connected components determined during a verification process, the document verification system further comprising a splitting connected component determining circuit, routine or manager that determines, for each of at least some of the determined connected components, whether that connected component lies within a region around one of the connected component determined during the authentication process to likely correspond to at least two connected components determined during a verification process based on the position information.

31. The document verification system of claim 29, wherein a first portion of the authentication data includes information about connected components used during an authentication process as initial members of groups of connected components used in ordering the determined connected components during the authentication process, the document verification system further comprising a connected components ordering circuit, routine or manager that determines an order of the connected components from a start location of the electronic image data based on information about one of the initial members used during the authentication process contained in the appended document data and determined connected components that have not already been added to an ordered list of the connected components.

32. The document verification system of claim 29, wherein the representative value generating circuit, routine or manager generates, as the at least one representative value based on the generated connected components, a hash value of the positions of a set of the generated connected components.

33. The document verification system of claim 32, wherein the representative value generating circuit, routine or manager generates the hash value of the positions of a set of the generated connected components based on a position-dependent hashing function.

34. The document verification system of claim 29, wherein the representative value generating circuit, routine or manager generates, as the at least one representative value based on the generated connected components, a hash value of shapes of the generated connected components.

35. The document verification system of claim 34, wherein the representative value generating circuit, routine or manager generates the hash value of the positions of a set of the generated connected components based on a shape-dependent hashing function.

36. The document verification system of claim 29, further comprising a document aligning circuit, routine or manager that at least one of aligns the electronic image data to desired dimensions and that modifies gray scale levels of at least some of the image values of the electronic image data.

37. The document verification system of claim 36, wherein, when the document aligning circuit, routine or manager aligns the electronic image data to desired dimensions, the document aligning circuit, routine or manager remaps a number of alignment marks in the electronic image data to predetermined relative locations between the location marks and rescales the electronic image data based on the remapped locations of the alignment marks.

38. The document verification system of claim 36, wherein, when the document aligning circuit, routine or manager modifies the gray scale levels of at least some of the image values of the electronic image data, the document aligning circuit, routine or manager modifies the gray scale levels of at least some of the image values of the electronic image data based on a gray level histogram contained in the appended document data.

* * * * *